(12) United States Patent
Byrne et al.

(10) Patent No.: US 11,301,350 B1
(45) Date of Patent: Apr. 12, 2022

(54) AUTOMATED TESTING OF SYSTEMS AND APPLICATIONS

(71) Applicant: Amazon Technologies, Inc., Seattle, WA (US)

(72) Inventors: Jason Patrick Byrne, Newbridge (IE); Kinshuk Pahare, Fremont, CA (US); Warren Robert Russell, Dublin (IE)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/036,937

(22) Filed: Sep. 29, 2020

(51) Int. Cl.
| | |
|---|---|
| G06F 11/00 | (2006.01) |
| G06F 11/32 | (2006.01) |
| G06F 11/30 | (2006.01) |
| G06F 9/54 | (2006.01) |
| G06F 11/273 | (2006.01) |
| G06F 11/07 | (2006.01) |

(52) U.S. Cl.
CPC ............ G06F 11/327 (2013.01); G06F 9/54 (2013.01); G06F 11/0772 (2013.01); G06F 11/2733 (2013.01); G06F 11/301 (2013.01); G06F 11/3006 (2013.01)

(58) Field of Classification Search
CPC .............. G06F 11/327; G06F 11/0772; G06F 11/2733; G06F 11/3006; G06F 11/301; G06F 11/0766; G06F 11/36; G06F 11/3672; G06F 11/3644; G06F 11/3668; G06F 9/54

See application file for complete search history.

(56) References Cited

U.S. PATENT DOCUMENTS

| | | | |
|---|---|---|---|
| 10,986,013 B1* | 4/2021 | Theimer | H04L 43/12 |
| 2015/0161025 A1* | 6/2015 | Baset | G06F 11/3612 |
| | | | 714/38.1 |
| 2017/0024299 A1* | 1/2017 | Deng | G06F 11/263 |
| 2018/0039567 A1* | 2/2018 | Rajagopalan | G06F 11/3672 |
| 2021/0200525 A1* | 7/2021 | Shmouely | G06F 8/65 |

* cited by examiner

*Primary Examiner* — Joseph D Manoskey
(74) *Attorney, Agent, or Firm* — Thomas Horstemeyer, LLP

(57) ABSTRACT

Disclosed are various embodiments for automated testing of systems and applications. A computing device can receive a command to execute a test, the test comprising at least one fault instruction and an alarm, the alarm being specified as an evaluation criterion for the test. The computing device can then send the fault instruction to a fault injection service. Next, the computing device can receive a message from a monitoring service, the message indicating that the alarm has been triggered subsequent to sending the fault instruction to the fault injection service. Subsequently, the computing device can determine that the test has failed based at least in part on the alarm being triggered. Finally, the computing device can send a failure notification to a predefined recipient in response to detecting that the alarm has been triggered.

20 Claims, 10 Drawing Sheets

… (1) …

AUTOMATED TESTING OF SYSTEMS AND APPLICATIONS

BACKGROUND

Chaos engineering is a term used to describe approaches to testing the resiliency of computer systems in the face of unexpected external conditions. Chaos engineering may include intentionally introducing unexpected or unplanned faults into a system to determine how the system will react in response to the fault. The results of such experiments can then be evaluated to determine whether the system can provide an adequate quality of service, or any service at all, when faced with unexpected or unplanned faults. For example, chaos engineering principles can be used to verify that a redundant system architecture provides an acceptable level of service in response to a failure of one or more components. As another example, chaos engineering principles can be used to identity the tipping point(s) at which a system would fail to provide adequate service in response to one or more failures or faults in the system.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
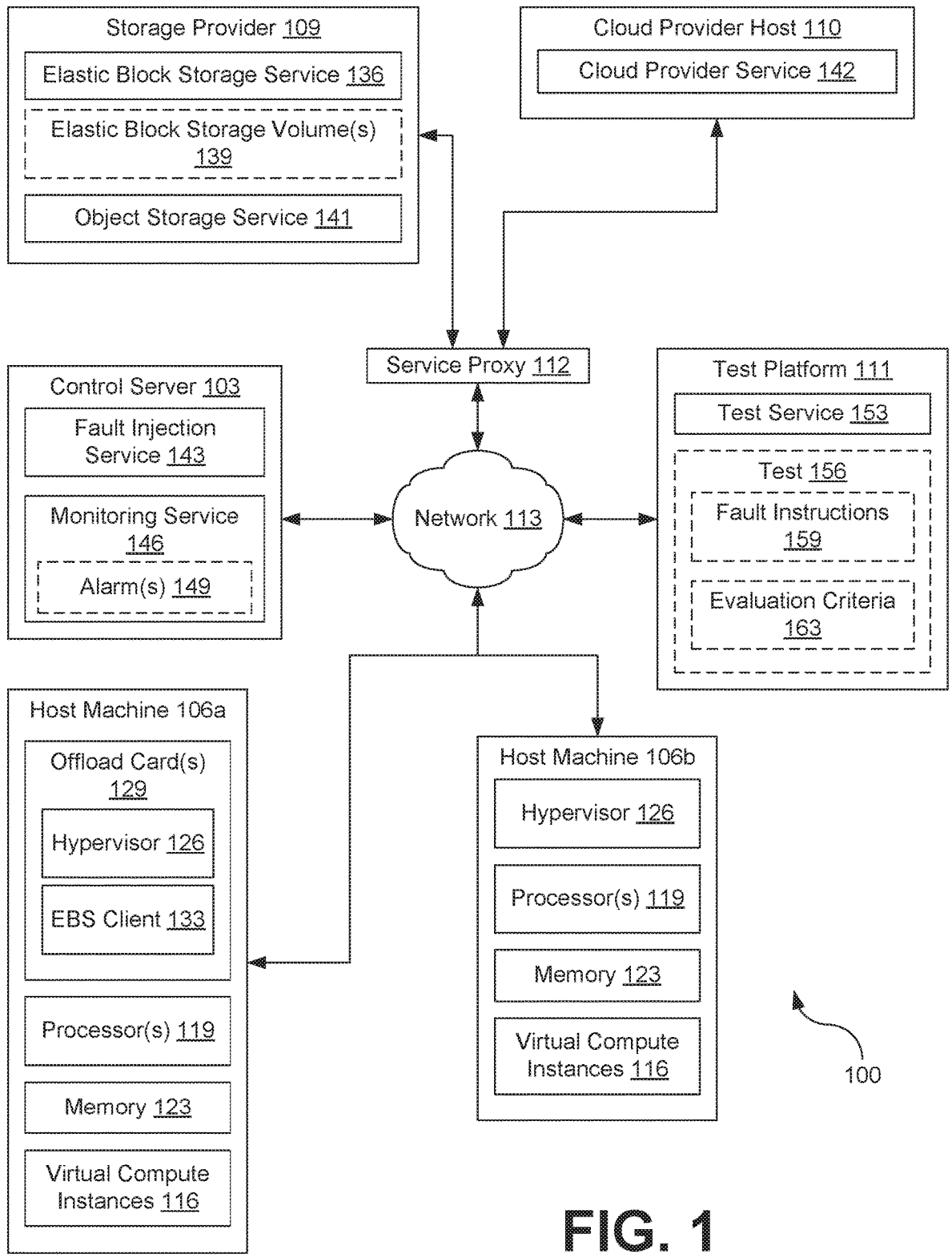
FIG. 1 is a drawing of a cloud provider network according to various embodiments of the present disclosure.

Disclosed are various approaches for automated testing of applications and systems using chaos engineering principles. One or more faults are defined for an application, service, or system. The faults are then automatically injected or introduced into the application, service, or system. Changes that occur to the application, service, or system after introduction of the fault(s) are recorded for further analysis.

When the automated testing framework and infrastructure is provided by the operator, owner, or provider of a cloud provider network, a number of options for testing are available. For example, any type of failure can be simulated, and real failures can be introduced for testing purposes instead of simulated failures, because the operator, owner, or provider of the cloud provider network has complete control of the host machines and host environment. Moreover, users do not have to install, track, update, or otherwise maintain third-party agents installed on their virtual machines. Instead, the users can rely on the services and tools provided by the owner, operator, or provider of the cloud provider network.

In contrast, approaches that may be used by third-parties are often more limited. For example, a third-party agent installed within or executed by a virtual machine is often limited to manipulating the virtual machine itself, because security mechanisms prevent the third-party agent from manipulating the environment or machine that hosts the virtual machine. Accordingly, the types of failures that can be tested by a third-party agent are often more limited than the types of failures that could be tested using tools or services with direct access to the host machines or host environment. Moreover, the third-party agent installed on the virtual machine consumes some of the resources allocated to the virtual machine. This both reduces the efficiency of any applications hosted by the virtual machine and impacts the accuracy of the results of any tests initiated by the third-party agent. For example, if the third-party agent implements resource constraints on the virtual machine in which the third-party agent is installed, and an application experiences performance degradation, it can be difficult to determine whether the performance degradation was solely the result of the constrained resources, or if the additional resources consumed from hosting the third-party agent in the resource constrained virtual machine caused the performance degradation. Moreover, processor and memory resources allocated to the third-party agent cannot be used by other applications executed on the virtual machine.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

FIG. 1 illustrates a cloud provider network 100 according to various embodiments of the present disclosure. The cloud provider network 100 (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network 100 can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network 100, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network 100 to provide low-latency resource access to customers on a global scale with a high degree of fault tolerance and stability.

The cloud provider network 100 can be used to provide cloud computing services to end users. With cloud computing, instead of buying, owning, and maintaining their own data centers and servers, organizations can acquire technology such as compute power, storage, databases, and other services on an as-needed basis. The cloud provider network 100 can provide on-demand, scalable computing platforms to users through a network, thereby allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

The traffic and operations of the cloud provider network 100 may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers 103. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

Accordingly, the cloud provider network 100 can include a number of components. For example, the cloud provider network 100 could include a control plane that includes one or more control servers 103. The could provider network 100 could also include one or more host machines 106a, 106b, etc. (collectively referred to as "host machines 106"), a storage provider 109, one or more cloud provider hosts 110, and one or more test platforms 111. In some implementations, a service proxy 112 can also be deployed in between the storage provider 109 or the cloud provider host 110 and other systems or services.

All of these components can be in data communication with each other via a network 113. The network 113 includes wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 113 can also include a combination of two or more networks 113. Examples of networks 113 can include the Internet, intranets, extranets, virtual private networks (VPNs), and similar networks.

The control server 103 can represent one or more servers that implement or provide control plane operations over the logical control plane of the cloud provider network 100. To assist in the implementation of control plan operations, the control server 103 may implement various control services. These control services can provide an administrative interface for configuring the operation of individual components of the cloud provider network 100, such as configuring one or more host machines 106 to provide the resources requested by a user of the cloud provider network 100. As an example, the control services hosted by the control server 103 may provide a mechanism that allows users to allocate or modify the resources consumed by the user of the cloud provider network 100. This can include instantiating or modifying computing, networking, or storage resources provided by the cloud provider network 100. For instance, the control server 103 could implement user commands to create, modify, or terminate virtual machines hosted by cloud provider network 100, assign storage to virtual machines, create pools of shared storage, etc.

One or more host machines 106 may also be present in the cloud provider network 100. Each host machine 106 can provide an operating environment for one or more compute instances 116. In addition, each host machine 106 can include one or more processors 119 and memory 123, which can be allocated to individual ones of the virtual compute instances 116. Moreover, a host machine 106 can have a hypervisor 126 installed to manage and coordinate the execution of any virtual compute instances 116 hosted by the host machine 106. The host machines 106 could be deployed, for example, as a part of an elastic cloud service (referred to in various implementations as an elastic compute service, a virtual machines service, a computing cloud service, a compute engine, or a cloud compute service).

The cloud provider network 100 may offer virtual compute instances 116 (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances 116 may correspond to one of several instance types or families. An instance type may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

It will be appreciated that such virtualized compute instances 116 may also be able to run in other environments, for example on the premises of customers, where such on-premise instances may be managed by the cloud provider or a third party. In some scenarios, the virtual compute instances 116 may be micro-virtual machines (microVMs). The cloud provider network 100 may offer other compute resources in addition to instances and microVMs, such as containers (which may run in instances or bare metal) and/or bare metal servers that are managed by a portion of a cloud provider service running on an offload card of the bare metal server.

The hypervisor 126, also known as a Virtual Machine Manager (VMM), allows multiple virtual compute instances 116 (e.g., virtual machines) to run on and share the same underling hardware. Each operating system created by and run/controlled by the hypervisor 126 is called a domain or guest OS, and the hypervisor's operating system, if any, is called the host OS. The hypervisor exists outside of a guest OS to intercept the commands sent to the computer hardware.

In some embodiments, the execution of virtual compute instances 116 is supported by hypervisor 126 in the role of a lightweight virtual machine manager (VMM). These lightweight VMMs enable the launch of lightweight microVMs in non-virtualized environments in fractions of a second. These lightweight VMMs can also enable container runtimes and container orchestrators to manage containers as microVMs. These microVMs nevertheless take advantage of the security and workload isolation provided by traditional VMs and the resource efficiency that comes along with containers, for example by being run as isolated processes by the VMM. A microVM, as used herein, refers to a VM initialized with a limited device model and/or with a minimal OS kernel that is supported by the lightweight VMM, and which can have a low memory overhead of <5 MiB per microVM such that thousands of microVMs can be packed onto a single host machine 106. For example, a microVM can have a stripped-down version of an OS kernel (e.g., having only the required OS components and their dependencies) to minimize boot time and memory footprint. In one implementation, each process of the lightweight VMM encapsulates one and only one microVM. The process can run the following threads: API, VMM and vCPU(s). The API thread is responsible for the API server and associated control plane. The VMM thread exposes a machine model, minimal legacy device model, microVM metadata service (MMDS), and VirtIO device emulated network and block devices. In addition, there are one or more vCPU threads (one per guest CPU core). A microVM can be used in some implementations to run a containerized workload.

In some implementations, customers of a cloud provider can deploy containers by managing clusters of virtual compute instances 116 that run container agents. In such implementations, customers manage scaling, monitoring, patching, and security of the virtual compute instances 116, in addition to managing their containerized workload. In some implementations, customers of a cloud provider may deploy and scale containerized workloads automatically without having to manage the underlying computing resources, for example via a container management service that receives information from a customer about their workload and then automatically selects the appropriate compute resources to run the workload. Beneficially, such a "serverless container" approach abstracts away the underlying infrastructure, enabling the customer to simply focus on their containerized application, by managing clusters of virtual compute instances 116 on behalf of the customer.

In some implementations, at least a subset of virtualization management tasks may be performed at one or more offload cards 129 so as to enable more of the processing capacity of the host machine 106a to be dedicated to client-requested compute instances—e.g., cards connected via PCI or PCIe to the physical CPUs 119 and other components of the virtualization host may be used for some virtualization management components. Such an offload card 129 of the host machine 106 can include one or more CPUs that are not available to customer instances, but rather are dedicated to instance management tasks such as virtual machine management, input/output virtualization to network-attached storage volumes, local migration management tasks, instance health monitoring, and the like.

For example, a host machine 106a could use the CPUs of the offload card 129 to execute the hypervisor 126 managing the virtual compute instances 116 on the host machine 106a. This would be in contrast to a host machine 106b, where a hypervisor 126 consumes at least some of the resources of the processors 119 and memory 123 of the host machine 106b that would otherwise be available to the virtual compute instances 116 hosted on the host machine 106b.

As another example, a host machine 106a could execute an elastic block store client 133. The elastic block store (EBS) client 133 may be implemented on an offload card 129 that is connected to and controls the host machine 106a that includes the processing units (e.g., CPUs or GPUs) of the compute instance. The elastic block store client 133 represents instructions that enable a virtual compute instance 116 to connect to, and perform I/O operations at, a remote data volume (e.g., a data volume stored on a physically separate computing device accessed over a network), such as data storage provided by the storage provider 109. For example, the EBS client 133 could communicate with an EBS service 136 hosted by the storage provider 109 to create an attachment between one or more EBS volumes 139 and one or more virtual compute instances 116 hosted on the host machine 106a. An attachment between an EBS volume 139 and a virtual compute instance 116 refers to the establishment of a connection between the virtual compute instance 116 and the EBS volume 139 made by the EBS client 133. This connection may be referred to as a "lease" in some implementations, and it enables the virtual compute instance 116 to view the EBS volume 139 as if it were a local storage drive, even though the EBS volume 139 and the virtual compute instance 116 may be hosted on different physical machines and communicating over a network.

An EBS service 136 (referred to in various implementations as a cloud disks service, a managed disk service, a cloud block storage service, storage area network (SAN) service, a persistent disk service, a block volumes service, etc.) can be executed to provision and manage EBS volumes 139. The EBS volumes 139 can represent raw, block-level storage provided by the EBS service 136 that can be attached to a virtual compute instance 116 through an EBS attachment created by an EBS client 133. A range of possible EBS volumes 139 may be provided or offered by the EBS service 136, such as solid state drive (SSD) backed volumes that offer low-latency response times for random IO or disk-backed volumes that provide low-cost or high-throughput storage.

The storage provider 109 can also host an object storage service 141. An object storage service 141 can be executed by the storage provider 109 to provide an object store that manages data as objects. Each object stored in the object storage service 141 can include data about itself and a globally unique identifier that distinguishes the object from other objects stored by the object storage service 141. Due to the object-based nature of the object storage service 141, users can often store large amounts of unstructured data in a cost-effective manner. The object storage service 141 can offer object storage, access, and retrieval through the network 113 (e.g., through the use of a web or network-based API). Examples of Object storage services 141 can include AMAZON WEB SERVICES S3, MICROSOFT AZURE BLOB STORAGE, GOOGLE CLOUD STORAGE, and RACKSPACE FILES.

One or more cloud provider host(s) 110 can be in the cloud provider network 100 to host and provide various cloud provider services 142 to customers, users, and consumers of the cloud provider network 100. Cloud provider host(s) 110 can include both bare-metal and virtual machines, which can host individual instances of cloud provider services 142.

Cloud provider services 142 can include any network accessible service that provides functionality that could be used by a virtual compute instance 116 or an application hosted by a virtual compute instance 116. Examples of cloud provider services 142 include network services such as managed databases (e.g., relational databases, key-value stores, etc.), domain name service (DNS) servers, function as a service platforms (e.g., AMAZON AWS LAMBDA, GOOGLE CLOUD FUNCTIONS, MICROSOFT AZURE FUNCTIONS, APACHE OPENWHISK, etc.), software as a service platforms (e.g., hosted applications), etc.

In some implementations, a service proxy 112 can be place between the storage provider 109 and/or the cloud provider host 110 and the network 113. The service proxy 112 can be used in conjunction with the fault injection service 143 to simulate faults or errors that may be experience while interacting with the EBS service 136, the object storage service 141, and/or the cloud provider service 142. In some implementations, the service proxy 112 may be deployer permanently to filter and process all traffic between the network 113 and the EBS service 136, the object storage service 141, and/or the cloud provider service 142. In other implementations, the service proxy 112 could be inserted or removed from the route between the network 113 and the EBS service 136, the object storage service 141, and/or the cloud provider service 142 as desired. Further details about these various implementations are provided in the discussion accompanying the subsequent figures.

A control server 103 can execute one or more services that interact with the previously described components of the cloud provider network 100. These services can include a fault injection service 143 and a monitoring service 146.

The fault injection service 143 can be executed to create or introduce unexpected or unplanned failures or errors into a system hosted by the cloud provider network 100. Generally, the fault injection service 143 can introduce a fault specified by a user or owner of the cloud provider network 100 resource(s) to be tested. This could be singular fault that will last for a predefined duration of time, or a series of faults that are introduced in series or parallel as part of a larger experiment. Because the fault injection service 143 is hosted on a control server 103 that is a component of the logical control plane of the cloud provider network 100, the fault injection service 143 can communicate directly with the host machines 106, offload cards 129, storage provider 109, or network 113 to introduce faults. In contrast, customer or user installed agents executing on customer virtual compute instances 116 may be unable to access the underlying hardware (e.g., host machines 106) or services of the cloud provider network 100 to introduce faults for system or application testing purposes.

There are many different types of faults that could be introduced into the cloud provider network 100 by the fault injection service 143. As an illustrative example, the fault injection service 143 could send a command to the hypervisor 126 that instructs the hypervisor 126 to alter (e.g., reduce or otherwise throttle) the processor(s) 119 or memory 123 resources made available to a specified virtual compute instance 116. This could include altering the amount of processor 119 cycles made available to the virtual compute instance 116. For example, the number of processor 119 cycles could be reduced to simulate resource contention for the processor 119 of the host machine 116. This could also include altering (e.g., reducing) the amount of memory 123 made available to the specified virtual compute instance 116 to simulate resource contention for the memory 123 of the host machine 106. In a similar example, the fault injection service 143 could send a command to the hypervisor 126 that instructs the hypervisor 126 to alter (e.g., reduce) the network bandwidth available to the specified virtual compute instance 116 to simulate a congested connection to the network 113. Likewise, the fault injection service 143 could send a command to the hypervisor 126 that instructs the hypervisor 126 to drop a specified percentage of packets sent from or destined for the specified virtual compute instance 116 to simulate a congested connection to the network 113. The fault injection service 143 could also send a command to the hypervisor 126 that instructs the hypervisor 126 to delay delivery of a specified number or percentage of packets sent from or destined for the specified virtual compute instance 116 by a specified amount of time to simulate latency in the connection with the network 113. As another illustrative example, the fault injection service could send a command to the EBS client 133 to drop or delay packets sent to or received from a specified EBS volume 139 attached to the specified virtual compute instance 116, which could have the effect of simulating an IO resource bottleneck. Similarly and alternatively, the fault injection service 143 could send a command to the EBS service 136 to delay responses or refuse to respond to IO requests for a specified EBS volume 139. This could also have the effect of simulating an IO resource bottleneck.

The fault injection service 143 can also cause more catastrophic faults to be simulated, such as service outages within the cloud provider network 100. For example, the fault injection service 143 could send a command to a hypervisor 126 to terminate or power-off one or more virtual compute instances 116 hosted on the host machine 106. As a similar example, the fault injection service 143 could send a command to the hypervisor 126 to drop all network traffic destined for or sent by the specified virtual compute instances 116. In either situation, the apparent effect would be that one or more host machines 106 (e.g., individual servers, individual data centers, or individual regions or availability zones) had become unavailable due to some sort of service, hardware, or network outage.

The monitoring service 146 can be used to receive monitoring data, events, or notifications from virtual compute instances 116, EBS clients 133, hypervisors 126, the elastic block storage service 136, network devices, or applications hosted using the various resources of the cloud provider network 100. The monitoring service 146 can also receive monitoring data, events, or notifications from third-party services. The monitoring service 146 can then surface information to users regarding the performance or utilization of their applications or the resources assigned to their applications. An example of a monitoring service 146 is AMAZON CLOUDWATCH, although similar services also exist.

For example, the monitoring service 146 could receive periodic reports (e.g., every minute, every fifteen (15) minutes, every hour, etc.) from host machines, hypervisors 126, applications hosted by virtual compute instances 116, the storage provider 109, the elastic block storage service 136, etc. The monitoring service 146 could then determine whether or not an alarm 149 had been triggered. If the alarm 149 had been triggered, the fault injection service 143 could be notified, causing any fault introduced by the fault injection service 143 to be reversed. An alarm 149 can represent a user or customer created rule that, when triggered, sends a notification to a specified target, such as the fault injection service 143.

The test platform 111 can represent any physical or virtual host that can execute or otherwise implement the test service 153. While depicted separately for the purpose of clarity, the test platform could be implemented as a virtual compute instance 116 on one or more most host machines 106 within the cloud provider network 100, or as a physical (e.g., "bare-metal") computing device within the cloud provider network 100.

The test service 153 can be implemented to execute and analyze the results of one or more tests 156. Accordingly, the test service 153 could invoke the fault injection service 143 to introduce faults in various components of the cloud provider network 100, as specified in one or more fault instructions 159 of a test 156. Similarly, the test service 153 could also receive messages from the monitoring service 146 regarding the impact or effect of a fault introduced by the fault injection service 143 to determine whether a test 156 passed or failed according to one or more evaluation criteria 163.

A test 156 can represent a fault or series of faults to be introduced into cloud provider network 100 in order to test, analyze, or evaluate how the cloud provider network 100, or virtual compute instances 116 within the cloud provider network 100 or applications that are hosted by or rely upon the services provided by the cloud provider network, would react in response to the occurrence of the faults. Accordingly, a test 156 can specify one or more fault instructions 159 to use to conduct the test 156 and one or more evaluation criteria 163 to determine whether the test 156 is passed or failed. The test 156 can also specify a recipient for notifications regarding whether the test 156 is passed or failed.

Fault instructions 159 can specify the type of fault to be introduced into the cloud provider network 100, the duration of the fault, the target of the fault, one or more fault parameters that specify how the fault is to be cause or implemented, and potentially other information. The target of the fault can represent the service, system, or application that will be implementing the fault, as further discussed. The additional information could, for example, identify which of the virtual compute instance(s) 116 are to be faulted.

Evaluation criteria 163 can represent the criteria used to determine whether a test 156 is passed or failed. In simple tests 156, a single evaluation criterion 163 may be present. However, comprehensive tests can include multiple evaluation criterion 163. Different types of evaluation criteria 163 can also be used, depending on the type of data to be analyzed to determine whether a test 156 passes or fails and based on how success or failure of the test 156 is defined.

In some implementations, the evaluation criteria 163 can specify one or more alarms 149, which may have been specially created for the purpose of evaluating the results of the test 156. If one or more of the alarms 149 are triggered, the test could be deemed to have failed. If none of the alarms 149 are triggered, the test could be deemed to have passed. The use of alarms 149 can be useful to determine whether a particular fault will have a measurable, technical impact on performance of the virtual compute instances 116 or applications hosted using the virtual compute instances 116.

In other implementations, the evaluation criteria 163 could include one or more instances of executable code that could be executed to analyze one or more components or parameters of the cloud provider network 100 to determine whether the test 156 passed or failed. In these implementations, the executable code could be evaluated by any appropriate runtime environment. In some instances, a copy of the executable code itself could be included in the evaluation criteria 163. In other instances, the network address or location of the executable code could be specified, as well as any arguments required for the executable code. For example, the executable code could include a package or container that includes or specifies one or more tasks or functions to be performed. This container could be pre-provisioned with an event-driven, serverless computing platform, which can execute the package or container in response to receiving a notification of an event occurring. Such platforms may be referred to as "function as a service (FaaS)" platforms (e.g., AMAZON AWS LAMBDA, GOOGLE CLOUD FUNCTIONS, MICROSOFT AZURE FUNCTIONS, APACHE OPENWHISK, etc.). An example of an event that could serve as a trigger for execution of the code could be initiation or completion of the test 156.

Executable code could be used as an evaluation criterion 163 for a number of reasons. For example, the executable code could be used in order to access data or platforms outside of the cloud provider network 100. As another example, the executable code could be used in order to evaluate performance metrics that are not captured or recorded by the monitoring service 146. For instance, a test 156 may pass if an operations center responds to a fault in less than a predefined amount of time. Accordingly, executable code could be used to determine whether a member of the operations center undertook some action within the predefined amount of time.

Next, a general description of the operation of the various components of the cloud provider network 100 is provided. Although the following description provides an illustrative example of the operation of, and interaction between, the various components of the cloud provider network 100, other interactions may also occur in various implementations of the present disclosure.

To begin, a user may wish to experiment with a system hosted by the cloud provider network 100 to determine the resiliency of the system to unexpected faults. Accordingly, the user may identify one or more faults or types of faults that he or she wishes to observe. The user can then provide details about the faults to the fault injection service 143, which can cause the specified faults to occur at a specified time and/or for a specified duration.

For example, a user may wish to determine how their system would respond in the face of a denial of service (DoS) attack. To simulate the impact of a DoS attack, the user could specify that the fault injection service 143 is to cause the available network bandwidth for the user's virtual compute instances 116 to be reduced by ninety percent (90%) for thirty (30) minutes. The user could also specify that the fault injection service 143 is to reduce the amount of available processor 119 resources by fifty percent (50%). This could simulate the impact that servicing a large number of requests would impose on the virtual compute instances 116 hosting the user's application.

The fault injection service 143 could then send commands to the hypervisors 126 of the host machines 106 hosting the specified virtual compute instances 116 (e.g., by invoking an appropriate function of an API provided by the hypervisor 126). The commands could specify that the hypervisors 126 were to reduce the available network bandwidth and available processor 119 resources for the specified virtual compute instances 116 by ninety percent and fifty percent, respectively. The hypervisors 126 could then alter the resources provided to the virtual compute instances 116 accordingly. For example, the hypervisors 126 could drop ninety (90%) of all packets sent to or destined for the specified virtual compute instances 116 or throttle the bandwidth by ninety percent (90%) (e.g., by reducing the bandwidth of a gigabit (1000 Mb) network connection to a one-hundred megabit (100 Mb)). Similarly, the hypervisors 126 could reduce the number of processor 123 cores assigned to the individual virtual compute instances 116 by half or reduce the share of individual processors 119 assigned to the individual virtual compute instances 116 by half (e.g., by restricting the individual virtual compute instances 116 to fifty percent (50%) of the available processor time or cycles).

For the duration of the specified faults, the user can monitor the impact on his or her application architecture. Some of this monitoring may be automated using third-party tools or using the monitoring service 146. Examples of the impact that the user may monitor for include metrics such as collecting metrics on the number of customer requests per unit of time the user's systems can process during the simulated DoS attack, the length of time the user's systems take to respond to individual customer requests, the average length of time the user's system requires to instantiate additional virtual compute instances 116 in response to the simulated DoS attack and the number of additional virtual compute instances 116 the user's system requests or requires to respond to the simulated DoS attack. This could reflect whether the user's system recognizes the fault, how long it takes to respond to the faults, and how many additional resources the user's system requires to appropriately scale in order to service customer requests in a timely manner in spite of the constraints imposed by the simulated DoS.

However, if the monitoring of the user's system causes an alarm 149 registered with the monitoring service 146 to be triggered, then the monitoring service 146 could send a message to the fault injection service 143 to reverse, undo, or revert the faults. This could be done, for example, to prevent unacceptable levels of harm from occurring to the user's systems or the user's operations or processes that rely upon the systems being tested. For example, if a user were testing the impact of a DoS attack on a live or production system, the user could have an alarm 149 set that, when the volume of customer transactions processed per second falls below a certain threshold, that an alarm 149 should be raised. If the reduction in network bandwidth and processor resources introduced by the fault injection service 143 caused the alarm 149 to be triggered, then the monitoring service 146 could send a message to the fault injection service 143 to revert, undo, or reverse the faults to avoid impacting the business operations of the customer beyond an acceptable threshold.

However, the user may also desire to test the impact on his or her applications when other services in the cloud provider network 100 fail to perform as expected or designed. For example, a user may wish to simulate the impact when the EBS service 136, object storage service 141, or cloud provider service 142 throttles requests. Similarly, the user may wish to simulate the impact that delayed responses (e.g., due to network latency or reduced bandwidth) received from the EBS service 136, object storage service 141, or a cloud provider service 142 would have on a user's applications. As another example, a user may wish to analyze the impact that errors received from the EBS service 136, object storage service 141 or cloud provider service 142 could have on a user's applications.

Accordingly, the user could similarly use the fault injection service 143 to introduce faults into the interactions with the EBS service 136, object storage service 141, or cloud provider service 142. For example, the fault injection service 143 could invoke a function of an API to configure the EBS service 136, object storage service 141, or cloud provider service 142 to fail to respond to a specified fraction or percentage of requests received from a specified user or application. Similarly, the fault injection service 143 could invoke a function of an API to configure the EBS service 136, object storage service 141, or cloud provider service 142 to delay sending a response to a specified fraction or percentage of requests received from a specified user or application. As another example, the fault injection service 143 could invoke a function provided by the API to configure the EBS service 136, object storage service 141, or cloud provider service 142 to return errors in response to a specified fraction or percentage of requests received from a specified user or application.

However, some implementations of an EBS service 136, object storage service 141, or cloud provider service 142 may be unable to safely or effectively inject faults. For example, adding a delay to a response could cause a connection to be kept open longer than necessary, preventing another connection from another user from being made. The result would be that injecting faults for one user could also cause other users to experience service outages or disruptions.

In these instances, the fault injection service 143 could instantiate a service proxy 112 and cause the requests from the specified user or application to be redirected through the service proxy 112. The service proxy 112 could be configured to receive requests from the user for the EBS service 136, object storage service 141, or cloud provider service 142 and inject faults as specified by the fault injection service 143. For example, the service proxy 112 could be configured to drop a specified fraction of or percentage of requests. The service proxy 112 could be configured to delay forwarding a specified fraction or percentage of requests by a specified amount of time. Similarly, the service proxy 112 could also be configured to delay forwarding a response back to the user or the application for a specified fraction or percentage of the requests. The service proxy 112 could also be configured by the fault injection service 143 to generate and return error messages to specified percentage or fraction of requests received by the user or application instead of forwarding or dropping the requests.

Figure 2:
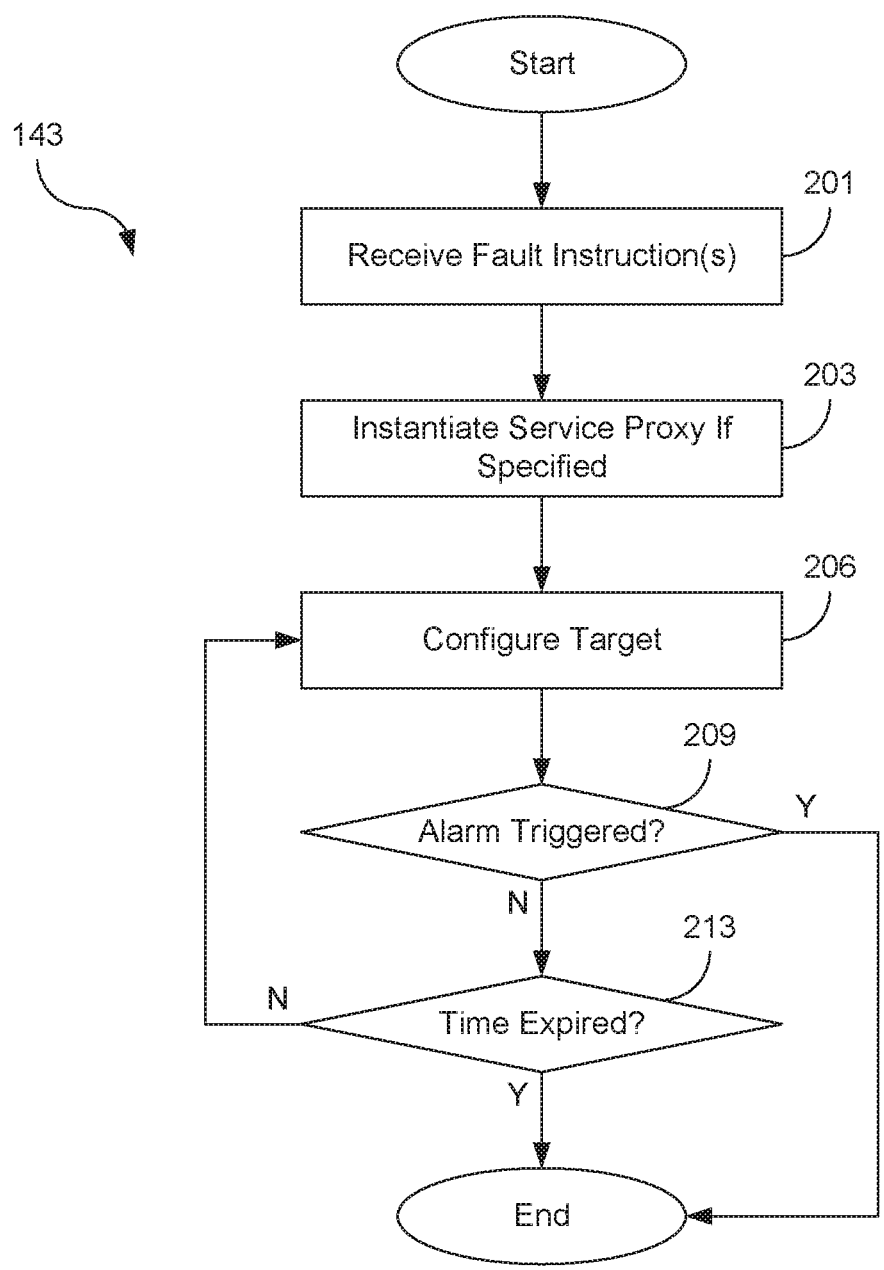
FIG. 2 is a flowchart illustrating one example of functionality implemented as portions of an application executed in the cloud provider network of FIG. 1 according to various embodiments of the present disclosure.

Referring next to FIG. 2, shown is a flowchart that provides one example of the operation of a portion of the fault injection service 143. The flowchart of FIG. 2 provides merely an example of the many different types of functional arrangements that can be employed to implement the operation of the depicted portion of the fault injection service 143. As an alternative, the flowchart of FIG. 2 can be viewed as depicting an example of elements of a method implemented within the cloud provider network 100.

Beginning with block 201, the fault injection service 143 can receive one or more fault instructions 159. These fault instructions 159 could, for example, be received from a test service 153 that is performing a test 156 of the cloud provider network 100. As another example, the fault injection service 143 could receive a message from a client device using a management or administrative console, wherein the message contains one or more fault instructions 159. This could occur, for instance, when a user is manually testing the performance of virtual compute instances 116 or applications hosted by one or more virtual compute instances 116. While there are many types of faults that could be introduced by the fault injection service 143, a number of examples are provided below.

For example, the fault instruction 159 could specify that the hypervisor 126 of a host machine 106 is to throttle the processor 119 assigned to a virtual compute instance 116. Throttling could include a reduction in the amount of CPU cycles available to the virtual compute instance 116, or a reduction in the number of virtual CPUS (vCPUs) assigned to the virtual compute instance 116. By throttling the processor 119 assigned to the virtual compute instance 116, one could test how a virtual compute instance 116 would react to resource contention for the processor 119.

In a similar example, the fault instruction 159 could instruct the hypervisor 126 to make one or more burstable CPU credits unavailable to a virtual compute instance 116. Burstable CPU credits are often used by hosting providers to allow a virtual compute instance 116 to temporarily consume CPU cycles for a predefined amount of time above a baseline amount of CPU cycles normally assigned to the virtual compute instance 116. The more burstable CPU credits that a virtual compute instance 116 has assigned to, the longer the virtual compute instance 116 can consume a greater than normal allocated number of CPU cycles. Once a virtual compute instance 116 has consumed all of its assigned burstable CPU credits, it must wait until more burstable CPU credits are assigned. Burstable CPU credits may be used by the cloud provider network 100 to allow virtual compute instances 116 that normally consume a low level of CPU resources to temporarily utilize a greater number of CPU cycles to handle a sudden, time-limited, increase in processing demand. By making the burstable CPU credits unavailable to a virtual compute instance 116, one can test how the virtual compute instance 116 will react when it exhausts its burstable CPU credits before it has finished addressing a period of increased computing demand.

In another example, the fault instruction 159 could instruct the hypervisor 126 to alter (e.g., reduce) the amount of memory 123 of the host machine 106 assigned to the specified virtual compute instance 116. For example, the fault instruction 159 could specify that the amount of memory 123 allocated to the specified virtual compute instance 116 is to be altered (e.g., reduced) by a specified amount, fraction, or percentage. This could be done to analyze how a virtual compute instance 116 reacts in a low memory 123 environment or how an application hosted by the virtual compute instance 116 reacts to the virtual compute instance 116 frequently swapping out memory pages to disk.

In another example, the fault instruction 159 could instruct the hypervisor 126 to throttle the connection of the virtual compute instance 116 to the network 113. This could be done in several ways. For example, the fault instruction 159 could specify that the hypervisor 126 is to reduce the bandwidth available to the virtual compute instance 116. As another example, the fault instruction 159 could specify that the hypervisor 126 is to introduce latency in the connection to the network 113. For example, the fault instruction 159 could specify that the hypervisor 126 is to drop or discard a fraction of the packets sent by or destined for the virtual compute instance 116. As another example, the fault instruction 159 could specify that the hypervisor 126 is to delay sending a fraction of the packets sent by or destined for the virtual compute instance 116 by a specified amount of time.

In another example, the fault instruction 159 could instruct the hypervisor 126 (or the EBS client 133 in some implementations) to alter the amount of input/output (IO) operations performed by the specified virtual compute instance 116. For example, the fault instruction 159 could specify that IO operations should be altered by a specified amount. This could include reducing the number of IO operations per second (IOPS) by a predefined amount or reducing the throughput or bandwidth by a predefined amount. Similarly, the fault instruction 159 could instruct the hypervisor 126 (or the EBS client 133 in some implementations) to delay execution of IO operations. This could be done, for example, by adding a predefined amount of time between when an IO operation (e.g., a read or a write) is requested and when performance begins. This could also be done, for example, by adding a predefined amount of time between when the IO operation (e.g., the read or the write) completes and when the result is returned to the virtual compute instance 116. Moreover, IO operations could be throttled by having the hypervisor 126 block completion of IO operations. For example, the hypervisor 126 (or the EBS client 133 in some implementations) could drop or otherwise block or fail to complete a predefine portion of IO operations or requests as specified in the fault instruction 159.

In another example, the fault instruction 159 could instruct the hypervisor 126 to disconnect the specified virtual compute instance(s) 116 from the network 113. This could simulate the occurrence of a host machine 106 or groups of host machines 106 becoming inoperable or unreachable. This type of fault instruction 159 could even instruct multiple hypervisors 126 or groups of hypervisors 126 on multiple host machines 106 or groups of host machines 106 to disconnect the specified virtual compute instances 116 to simulate large scale service outages, such as when a large data center or group of data centers (e.g., an entire region or availability zone) becomes unreachable.

In another example, the fault instruction 159 could instruct the hypervisor 126 to modify the run-time state of the specified virtual compute instances 116. For example, the fault instruction 159 could specify that the hypervisor 126 is to shutdown, poweroff, or terminate the specified virtual compute instance 116. Similarly, the fault instruction 159 could specify that the hypervisor 126 is to reboot the specified virtual compute instance 116.

However, fault instructions 159 could also be directed towards service proxy 112, if instantiated, an elastic block storage service 136, an object storage service 141, or a cloud provider servicer 142.

For example, the fault instruction 159 could instruct a service proxy 112 to throttle responses to service requests for a service, such as the elastic block storage service 136, the object storage service 141, or the cloud provider service 142. Similarly, the fault instruction 159 could instruct the elastic block storage service 136, the object storage service 141, or the cloud provider service 142 itself to throttle responses to service requests. In these examples, the fault instruction 159 could specify one or more fault parameters specifying which service requests to drop and under which conditions the service requests should be dropped as arguments.

As another example, the fault instruction 159 could specify that responses to service requests should be delayed. For instance, the fault instruction 159 could instruct the service proxy 112 to delay forwarding service requests on to the elastic block storage service 136, the object storage service 141, or the cloud provider service 142 by an amount of time specified as a fault parameter. Similarly, the fault instruction 159 could specify that responses from the elastic block storage service 136, the object storage service 141, or the cloud provider service 142 be delayed by a specified amount of time.

In a third example, if the fault instruction 159 could specify that the service proxy 112 or the elastic block storage service 136, the object storage service 141, or the cloud provider service 142 generate and return error messages in response to service requests. For example, the fault instruction 159 could specify that service specific error messages be returned. As another example, the fault instruction 159 could specify that more generic error message be return (e.g., an HTTP response containing "Error Code 500—Internal Server Error" or "Error Code 504—Gateway Timeout Error").

In some instances, the fault instruction 159 could specify that a number of input/output operations per second (IOPS) provisioned for a service (e.g., the elastic block storage service 136, the object storage service 141, or the cloud provider service 141) should be altered. Provisioned IOPS can be used when a user wishes to guarantee a minimum number of IOPS be available when using a service. Accordingly, the fault instruction 159 could specify that some or all of the provisioned IOPS be made available to test the impact on a user's application or service when fewer provisioned IOPS are available.

It should be noted that fault instructions 159 are not limited to only the examples describe above. The described faults can be used in any combination (e.g., throttling of multiple resource types could be specified in a single fault instruction 159). Moreover, additional fault types appropriate for a deployed implementation may also be used beyond these examples.

Then, at block 203, the fault injection service 143 can instantiate a service proxy 112 if implementation of one or more of the fault instructions 159 received at block 201 specifies a target of the fault where a service proxy 112 is appropriate or required. For example, the fault instruction 159 might specify a target of the fault that does not provide an API with functions that could be invoked by the fault injection service 143 to introduce faults into the target. This could occur, for example, with the object storage service 141 or some cloud provider services 142. As another example, the fault instruction 159 might specify a fault or fault type which the target of the fault instruction 159 fails to support. For example, the object storage service 141 or some cloud provider services 142 may not provide support for introducing latency into their responses because of the impact it would cause on other users of the object storage service 141 or cloud provider service 142. For example, delaying a response might require keeping a connection open longer than necessary, which would prevent another user or service from accessing the object storage service 141 or cloud provider service 142 during that time. In all of these examples, a service proxy 112 could be used to inject faults without interacting with the target (e.g., the cloud provider service 142) directly.

In the event that a service proxy 112 is instantiated, the fault injection service 143 could also cause service requests destined for the service (e.g., the EBS service 136, the object storage service 141, or a cloud provider service 142) to be redirected to or otherwise traverse the service proxy 112. This could be done in a number of ways. As a simple example, DNS records for the service could be modified to resolve to the service proxy 112. As another example, routing tables in the network 113 could be modified so that the network address for the service routes to the service proxy 112 instead of the service.

Next at block 206, the fault injection service 143 can configure the target to inject the faults specified in the fault instructions received at block 201. This could be done in a number of ways. In some implementations, the fault injection service 143 may invoke a function of an application programming interface (API). In other implementations, the fault injection service 143 could provide a configuration file to the target, which the target could read and use as the basis for configuring itself to inject the specified faults.

For example, the fault injection service 143 could invoke one or more functions of an application programming interface (API) provided by a target of the fault. In many situations, the target may be the hypervisor 126, in which case the fault injection service 143 could invoke a function of an API provided by the hypervisor 126. In many other situations, the target may be the service proxy 112 instantiated at block 203, in which case the fault injection service 143 could invoke a function of an API provided by the service proxy 112. In some situations, the target could even be a service itself, such as the EBS service 136, object storage service 141, or a cloud provider service 142. In these situations, the fault injection service 143 could invoke a function of an API provided by the service itself. However, in other situations, the target could be a device on the network 113 (e.g., a switch, router, etc.), an application hosted by the offload card 129 of a host machine 106 (e.g., the EBS client 133 or the hypervisor 126), etc. Accordingly, the fault injection service 143 could analyze the fault instructions 159 received at block 201 to determine which target and which API functions should be invoked, as well as which arguments should be supplied to the API functions. The fault injection service 143 could then invoke the API function(s) to cause the fault specified in the fault instruction 159 to occur.

As another example, the fault injection service 143 could create a configuration file for use by the target. For example, the fault injection service 143 could create a configuration file that identifies the fault specified in the fault instruction 159, the parameters for the fault, the duration of the fault, and other information (e.g., entity identifier, applicable virtual compute instances 116, etc.). This configuration file could then be sent or otherwise provided or made available to the target. For example, the configuration file could be sent to the hypervisor 126, the service proxy 112, or one or more of the EBS service 136, the object storage service 141, or the cloud provider service 142.

There could be a number of different targets, each of which could provide an API for injecting, causing, or triggering faults. Accordingly, a number of illustrative examples of particular targets and API functions that could be invoked are provided in the following paragraphs. It should be noted, however, that these are not the only possible targets for injecting or triggering a fault, nor the only types of faults that target might provide through an API.

For example, if a fault instruction 159 received at block 201 specified that a processor 119 assigned to a virtual compute instance 116 is to be throttled, then the fault injection service 143 could identify an API function provided by the hypervisor 126 to invoke for throttling the processor 119 and provide arguments to the function based at least in part on the amount or degree of throttling specified as a fault parameter in the fault instruction 159.

Similarly, if the fault instruction 159 received at block 201 specified that an amount of memory 123 assigned to a virtual compute instance 116 is to be altered, then the fault injection service 143 could identify an API function provided by the hypervisor 126 to invoke for reducing the amount of host machine 106 memory 123 assigned and provide arguments to the function based at least in part on the amount of the reduction in memory 123 specified as a fault parameter in the fault instruction 159.

As another example, if the fault if the fault instruction 159 received at block 201 specified that a number of burstable CPU credits should be altered (e.g., at least a portion of burstable CPU credits assigned to a specified virtual compute instance 116 should be made unavailable), then the fault injection service 143 could identify an API function provided by the hypervisor 126 to invoke for removing or hiding the burstable CPU credits from the specified virtual compute instance 116 and provide arguments to the function based at least in part on the amount or fraction of burstable CPU credits specified as a fault parameter in the fault instruction 159.

In another example, if the fault instruction 159 received at block 201 specified that the connection of the virtual compute instance 116 to the network 113 is to be throttled, then the fault injection service 143 could identify an API function provided by the hypervisor 126 to invoke for throttling the connection to the network 113 and provide arguments to the function based at least in part on the fault parameters of the fault instruction 159. For instance, if the fault instruction 159 specifies that the bandwidth is to be altered by a specified amount, then the fault injection service 143 could use a first API function to cause the hypervisor 126 to alter the bandwidth by an amount specified in a fault parameter. Likewise, if the fault instruction 159 specifies that latency is to be added to the connection to the network 113, then the fault injection service 143 could use an API function that causes the hypervisor 126 to drop an amount of packets sent from or destined for the virtual compute instance 116, as specified in a fault parameter. Alternatively, the fault injection service could use an API function that causes the hypervisor 126 to add a predefined delay in sending a predefined fraction or portion of packets from the specified virtual compute instance 116 to the network 113 or add a predefined delay in delivering a predefined fraction or portion of packets received from the network 113 to the specified virtual compute instance 116.

In another example, if the fault instruction 159 received at block 201 specified that IO is to be throttled for a specified virtual compute instance 116, then the fault injection service 143 could identify an API function provided by the hypervisor 126 to invoke for throttling the IO and provide arguments to the function based at least in part on the type and amount or degree of throttling specified in the fault instruction 159. For example, the fault injection service 143 could invoke a first API function provided by the hypervisor 126 to introduce latency into the servicing of IO requests using arguments for the amount of latency to be introduced that are based at least in part on the amount of latency specified in the fault instruction 159. As another example, the fault injection service 143 could invoke a second API function provided by the hypervisor 126 to alter IO bandwidth or throughput by an amount specified as a fault parameter in the fault instruction 159.

In another example, if the fault instruction 159 received at block 201 specified that the specified virtual compute instance(s) 116 are to be made unavailable 116 to the network 113, then the fault injection service 143 could identify an API function provided by the hypervisor 126 to invoke for making the specified virtual compute instance(s)

116 unavailable and provide arguments to the function specifying a duration of time based at least in part on the fault instruction 159. Such an API function could cause the hypervisor 126 to disconnect the virtual compute instance 116 from the network 113, drop all traffic sent from or destined for the virtual compute instance 116, etc.

In a similar example, the fault injection service 143 could alternatively identify a DNS service (e.g., provided as a cloud provider service 142) or a network device on the network 113 (e.g., a switch, router, etc.). The fault injection service 143 could invoke an API provided by the DNS service to resolve requests for the virtual compute instance 116 to a non-routable network destination, sometimes referred to as a network blackhole or sinkhole. Likewise, the fault injection service 143 could invoke an API provided by the switch, router, or similar device to cause the switch or router to redirect traffic received from or destined for the specified virtual compute instance 116 to a non-routable network destination.

By making virtual compute instance 116 unreachable or unavailable across the network 113, one could simulate various levels of network outages. For example, one could simulate an outage or failure of a single host machine 106 or a cluster of host machines 106. At scale, one could even simulate an outage of entire datacenter, group of data centers, geographic region, availability zone, etc.

In another example, if the fault instruction 159 received at block 201 specified that the virtual compute instance 116 is to be terminated, shutdown, powered off, or rebooted, then the fault injection service 143 could identify an API function provided by the hypervisor 126 to invoke and provide arguments to the function based at least in part on the action specified in the fault instruction 159.

If the fault instruction 159 specified a service or service proxy 112 as the target, then the fault injection service 143 could identify an appropriate API function provided by the service (e.g., the EBS service 136, the object storage service 141, or a cloud provider service 142). For example, if the fault instruction 159 specified that responses to service requests were to be throttled, the fault injection service 143 could invoke an API function of the service or the service proxy 112 for dropping service requests and provide one or more fault parameters specifying which service requests to drop and under which conditions the service requests should be dropped as arguments. As another example, if the fault instruction 159 specified that responses to service requests should be delayed, then the fault injection service 143 could invoke an API function of the service or the service proxy 112 for delaying service requests and provide one or more fault parameters specifying which service requests to delay and how long they should be delayed as arguments. In a third example, if the fault instruction 159 specified that error messages should be generated and returned in response to service requests, then the fault injection service 143 could invoke an API function of the service or the service proxy 112 for returning error messages to service requests and provide one or more fault parameters specifying which service requests to generate errors for and which kinds of errors should be generated and returned.

In some implementations, the fault instruction 159 may specify a duration that fault should last. As a simple, illustrative example, the fault instruction 159 could specify that the fault should last for thirty (30) minutes. In these implementations, the fault injection service 143 could provide as an argument to the invoked API function the total time duration for the fault (e.g., thirty minutes). In these implementations, once the API function is invoked, the process would end.

However, other implementations may use an incremental approach, whereby the API function is invoked with a specified duration that is less than the total duration (e.g., one (1) minute). If no alarms 149 are raised, then the API function could be invoked again (e.g., specifying an additional minute). The fault injection service 143 could repeatedly invoke the API function until the total duration of time specified in the fault instruction 159 has elapsed. However, if an alarm 149 is raised prematurely, the fault injection service 143 could cease invoking the API function, so that the fault condition could be removed early and the cloud provider network 100, virtual compute instance 116, or host machine 106 could return to a stable state. In implementations where an incremental approach is used, the process would proceed to block 209. Accordingly, the fault injection service 143 could initiate a timer or counter to track how a current duration of a fault introduced by the fault injection service 143.

Next at block 209, the fault injection service 143 can determine whether an alarm 149 was triggered in response to the fault caused by invoking the API function at block 206. The alarm 149 could be an alarm associated with the virtual compute instance 116, service proxy 112, application or device sending traffic through the service proxy 112, or application or device sending traffic directly to a service (e.g., the EBS service 136, object storage service 141, or cloud provider service 142). For example, if the fault injection service 143 were invoking API functions provided by the hypervisor 126 to inject faults into a virtual compute instance 116, the alarm 149 could be associated with performance metrics of the virtual compute instance 116. As another example, if the fault injection service 143 were invoking API functions provided by the service proxy 112 or a service itself (e.g., the EBS service 136, the object storage service 141, a cloud provider service 142, etc.), then the alarm 149 could be associated with an application, device, or virtual compute instance 116 sending traffic (e.g., service requests) to the service or through the service proxy 112.

This could be done using several approaches. For example, the fault injection service 143 could receive a notification or message from the monitoring service 146 indicating that the alarm 149 had been triggered. However, in other instances, the fault injection service 143 itself could evaluate various performance metrics of the targeted virtual compute instances 116 to determine whether there had been a sufficient performance degradation to trigger an alarm 149. If the alarm 149 is triggered, then the process ends and no further invocations of the function provided by the API target (e.g., hypervisor 126, service proxy 112, etc.) will occur. This allows for any test of the impact of a particular fault to halt and revert automatically to a safe or permitted state. However, if no alarm 149 is triggered or raised, then the process can proceed to block 213.

Proceeding to block 213, the fault injection service 143 can determine whether the duration of the fault has expired. For example, the fault injection service 143 could evaluate whether a timer or counter has exceeded a duration of time specified in the fault instruction 159. If the timer or counter has yet to meet or exceed the duration of time specified in the fault instruction 159, the process could return to block 206 and the fault injection service could configure the target a second time. This loop can continue until the duration of time specified in the fault instruction 159 received at block 201 has passed, at which point the process can end.

In some implementations, however, the fault injection service 143 can instead receive a request from the target for confirmation that the faults should continue to be injected. For example, at block 206, the fault injection service 143 could have instructed the hypervisor 126, the EBS service 136, the object storage service 141, the cloud provider service 142, or the service proxy 112 to injects faults for a predefined period of time. At regular intervals, which could also have been specified at block 206, the target could request confirmation from fault injection service 143 regarding whether or not it should continue to inject faults. In these implementations, the fault injection service 143 could indicate either that faults should continue to be injected, in which case the process would loop back to step 209, or that faults should cease to be injected (e.g., due to an alarm being raised or the time period expiring). In this second scenario, the fault injection service 143 could respond to the target that it should cease injecting faults, and then the process would end.

It should also be noted that the fault injection service 143 could cause the target to cease injecting faults in response to other conditions or scenarios than those specified. For example, if the fault injection service 143 received an explicit or express command to end the injection of faults, the fault injection service 143 could invoke an API function provided by the target to cease injecting faults or push a configuration file to the target to configure the target to stop injecting faults.

Figure 3:
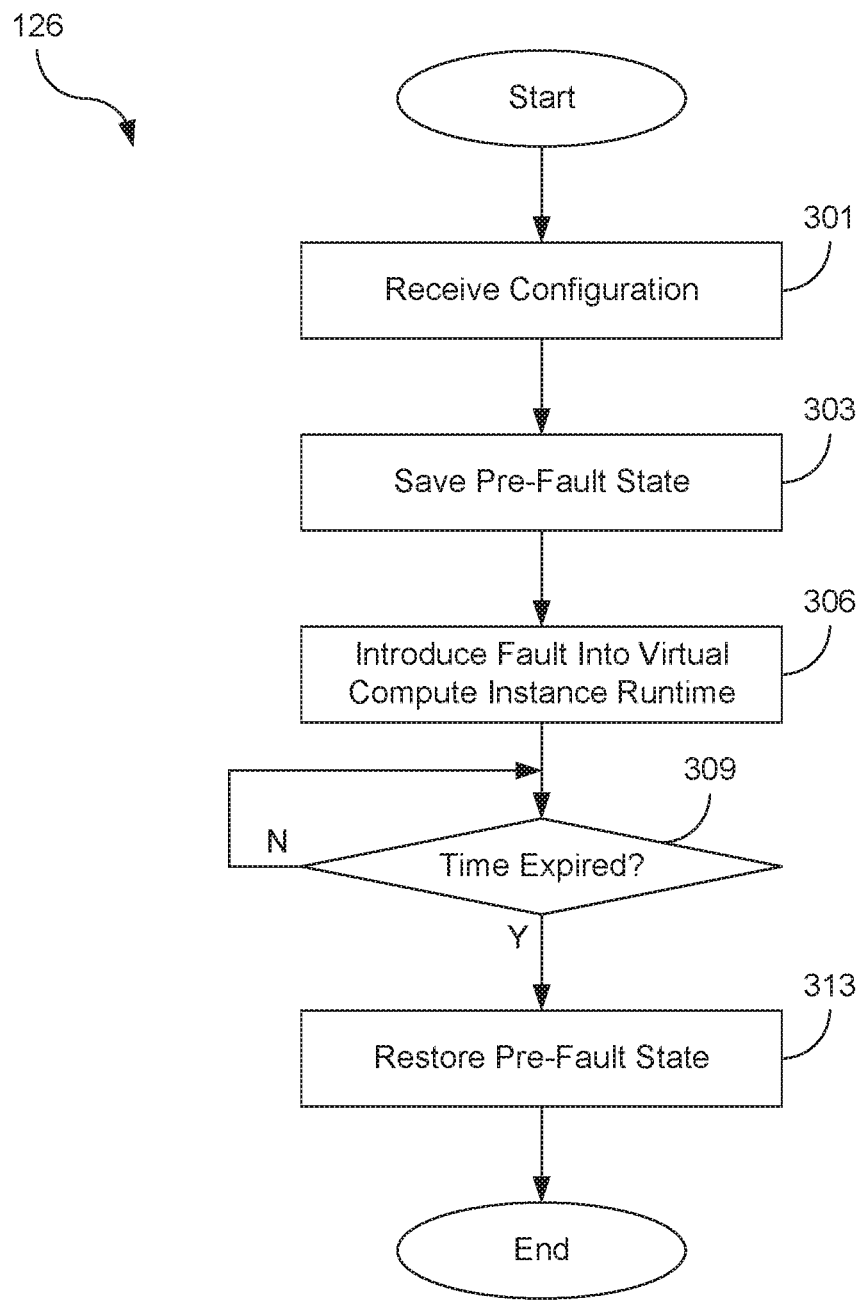
FIG. 3 is a flowchart illustrating one example of functionality implemented as portions of an application executed in the cloud provider network of FIG. 1 according to various embodiments of the present disclosure.

Referring next to FIG. 3, shown is a flowchart that provides one example of the operation of a portion of the hypervisor 126. The flowchart of FIG. 3 provides merely an example of the many different types of functional arrangements that can be employed to implement the operation of the depicted portion of the hypervisor 126. As an alternative, the flowchart of FIG. 3 can be viewed as depicting an example of elements of a method implemented within the cloud provider network 100.

Beginning with block 301, the hypervisor 126 can receive configuration information from the fault injection service 143. For example, the hypervisor 126 could receive an application programing interface (API) function call from the fault injection service 143. The API call could include values for arguments that identify one or more virtual compute instances 116 hosted by the fault injection service 143, the type or nature of the fault to be introduced, and the duration that the fault state or condition should exist. Similarly, the hypervisor 126 could receive a configuration file from the fault injection service 143, which could that identify one or more virtual compute instances 116 hosted by the fault injection service 143, the type or nature of the fault to be introduced, and the duration that the fault state or condition should exist. Examples of the type or nature of the fault have been previously provided in the discussion of FIGS. 1 and 2.

Then, at block 303, the hypervisor 126 can save the pre-fault state of the specified virtual compute instance 116. This can be done so that, after the specified duration of the fault has passed, the virtual compute instance 116 can return to the pre-fault state.

Next, at block 306, the hypervisor 126 can introduce the fault into the runtime state of the specified virtual compute instance 116. For example, the hypervisor 126 could modify the amount of processor 119 cycles or memory 123 allocated to the virtual compute instance 116 as specified in the arguments of the API function call or in the configuration file received at block 303. Likewise, the hypervisor 126 could modify the network connection or IO performance envelope or profile of the specified virtual compute instance 116 in the manner specified. If the API function call or configuration file specifies a time duration, then a timer or counter could be started as well. If the API function call or configuration file specified that the virtual compute instance is to be terminated, powered-off, or rebooted, the hypervisor 126 could perform these actions as well on the specified virtual compute instance 116.

If the fault was specified to last for a particular amount of time, then the hypervisor 126 could, at block 309, determine whether the counter or timer initiated at block 303 has surpassed the specified duration of time.

Once the specified duration of time has elapsed, then, at block 313, the hypervisor 126 could restore the virtual compute instance 116 to a pre-fault state. For example, if the hypervisor 126 had throttled the processor 119, network connection, or IO performance of the virtual compute instance 126, then the previous performance could be restored. Similarly, if burstable CPU credits had been made temporarily unavailable, then access to the burstable CPU credits could be restored to the virtual compute instance 116. Once the virtual compute instance 116 has been restored to the pre-fault state, the process can end.

Figure 4:
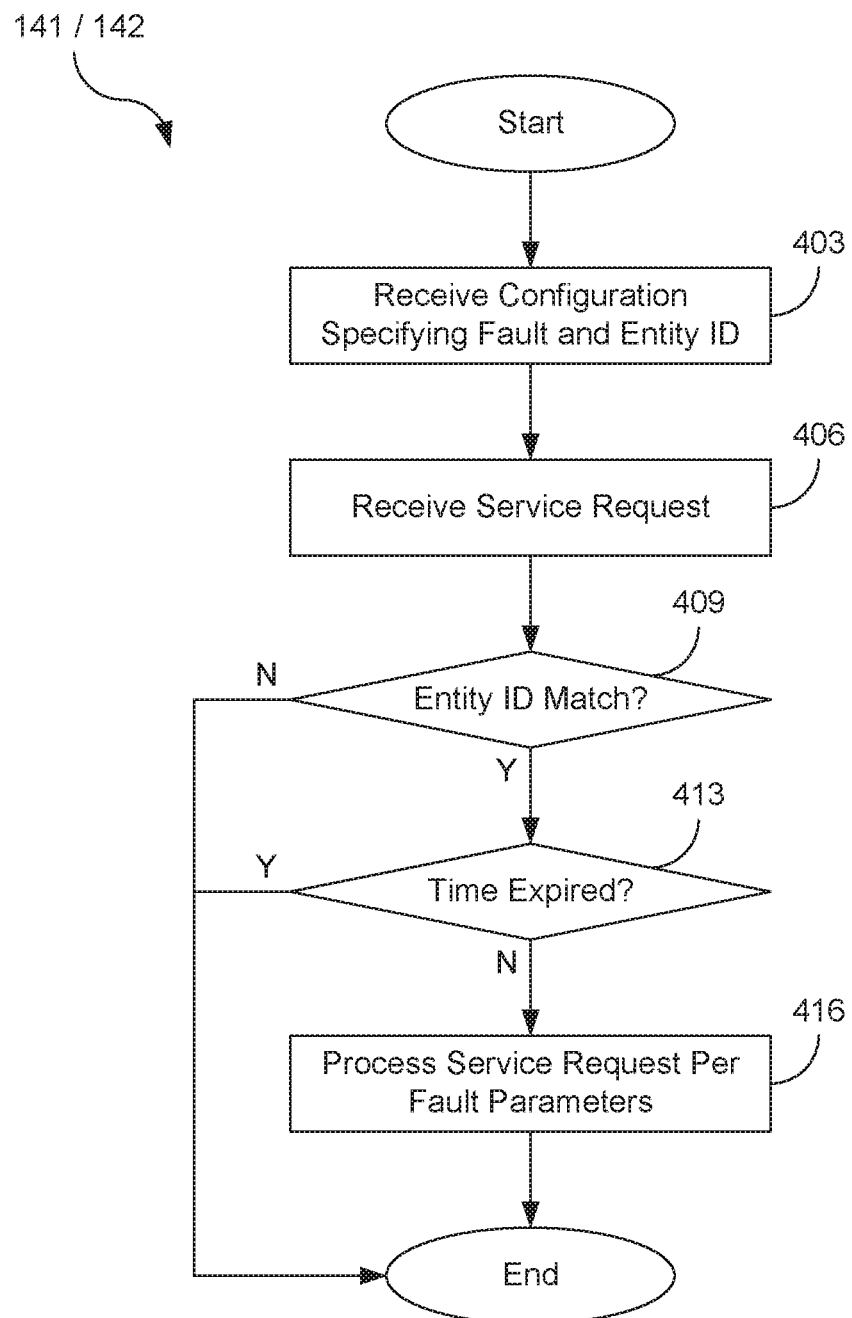
FIG. 4 is a flowchart illustrating one example of functionality implemented as portions of an application executed in the cloud provider network of FIG. 1 according to various embodiments of the present disclosure.

Referring next to FIG. 4, shown is a flowchart that provides one example of the operation of a portion of the object storage service 141 or cloud provider service 142. The flowchart of FIG. 4 provides merely an example of the many different types of functional arrangements that can be employed to implement the operation of the depicted portion of the object storage service or cloud provider service 142. As an alternative, the flowchart of FIG. 4 can be viewed as depicting an example of elements of a method implemented within the cloud provider network 100.

Beginning with block 403, the object storage service 141 or cloud provider service 142 can receive configuration information from the fault injection service 143. For example, the object storage service 141 or cloud provider service 142 could receive an invocation of an API function call from the fault injection service 143. The API function call can specify the entity identifier for whom or for which faults should be applied, the fault or type of fault to be applied, how long the fault should be applied to requests from the user, and one or more fault parameters. Fault parameters can specify how the fault should be created or injected. Examples can include how long to delay a response; the type of error message, code, or status to return in a response; a percentage or fraction of service requests to which faults should be applied or injected; or other criteria. Similarly, the object storage service 141 or cloud provider service 142 could receive a configuration file from the fault injection service 143, which could the entity identifier for whom or for which faults should be applied, the fault or type of fault to be applied, how long the fault should be applied to requests from the user, and one or more fault parameters. Examples of the types of faults that could be implemented include those previously discussed with respect to FIGS. 1 and 2.

Then, at block 406, the object storage service 141 or cloud provider service 142 can receive a service request. For example, the object storage service 141 could receive a request to access, modify, delete, or store data in an object store managed by the object storage service 141. Similarly, the cloud provider service 142 could receive a request to perform an action. For example, if the cloud provider service 142 were a managed database service, the service request could be to read, write, modify, or update data stored in the database. As another example, if the cloud provider service 142 were a DNS server, the service request could be to resolve a DNS record to a respective internet protocol address. In another example, if the cloud provider service 142 were a function as a service platform (e.g., AMAZON AWS LAMBDA, GOOGLE CLOUD FUNCTIONS, MICROSOFT AZURE FUNCTIONS, APACHE OPEN-WHISK, etc.), then the service request could represent a request to execute a function, task, or other set of executable code. Other types of cloud provider services 142 can receive other types of service requests.

The service request can also include an entity identifier, which allows the object storage service 141 or cloud provider service 142 to identify the entity (e.g., the user, organization, department, application, etc.) that is making the request. While the entity identifier can normally be used to allow the object storage service 141 or cloud provider service 142 to evaluate the permissions applicable to the request (e.g., which objects, files, or databases can be accessed, which computations or actions are permitted to be performed, etc.), the entity identifier can also be subsequently used to distinguish requests that should be subject to the fault conditions indicated at block 403 from requests that should be processed normally.

Next at block 409, the object storage service 141 or cloud provider service 142 can determine whether the entity identifier included in the service request received at block 406 matches the entity identifier received at block 403. If there is no match, the service request can be processed normally and the process ends. However, if the entity identifiers match, then the process proceeds to block 413.

Moving on to block 413, the object storage service 141 or cloud provider service 142 can determine whether the duration for which the fault should be applied to matching service requests, as specified at block 403, has expired. If the duration of time has expired, the service request can be processed normally and the process can end. However, if the duration of time specified at block 403 has yet to pass, then the process can proceed to block 416.

Then at block 416, the object storage service 141 or cloud provider service 142 can process the service request per the fault parameters specified in the API function call or the configuration file received at block 403. Many examples of the types of faults that could be implemented by the object storage service 141 or the cloud provider service 142 have been previously described in the discussion of FIGS. 1 and 2. As previously discussed, the object storage service 141 or cloud provider service 142 could fail to respond to the service request (or a specified fraction of matching service requests). Similarly, the object storage service 141 or cloud provider service 142 could add a delay to the response to the service request (or add a delay to a specified fraction of matching service requests), in order to simulate latency in responding to service requests.

However, in some instances the fault parameters could specify that a fault is to be applied to a fraction or percentage of the service requests received by the object storage service 141 or cloud provider service 142. In these instances, the object storage service 141 or cloud provider service 142 could first determine whether the service request received at block 406 is one of the fraction or percentage of the service requests received. For example, the object storage service 141 or cloud provider service 142 could select service requests on a round-robin basis as being subject to the fault. As another example, the object storage service 141 or cloud provider service 142 could select service requests at random until a fraction or percentage of an expected number of service requests have been subject to the fault. For instance, if three-hundred (300) service requests were expected in one hour, and one-third of the expected service requests were to be subject to a fault, the object storage service 141 or cloud provider service 142 could randomly select service requests to fault until one-hundred (100) service requests had been faulted. In these implementations, service requests that are not selected for fault injection could be processed normally by the object storage service 141 or cloud provider service 142.

Figure 5:
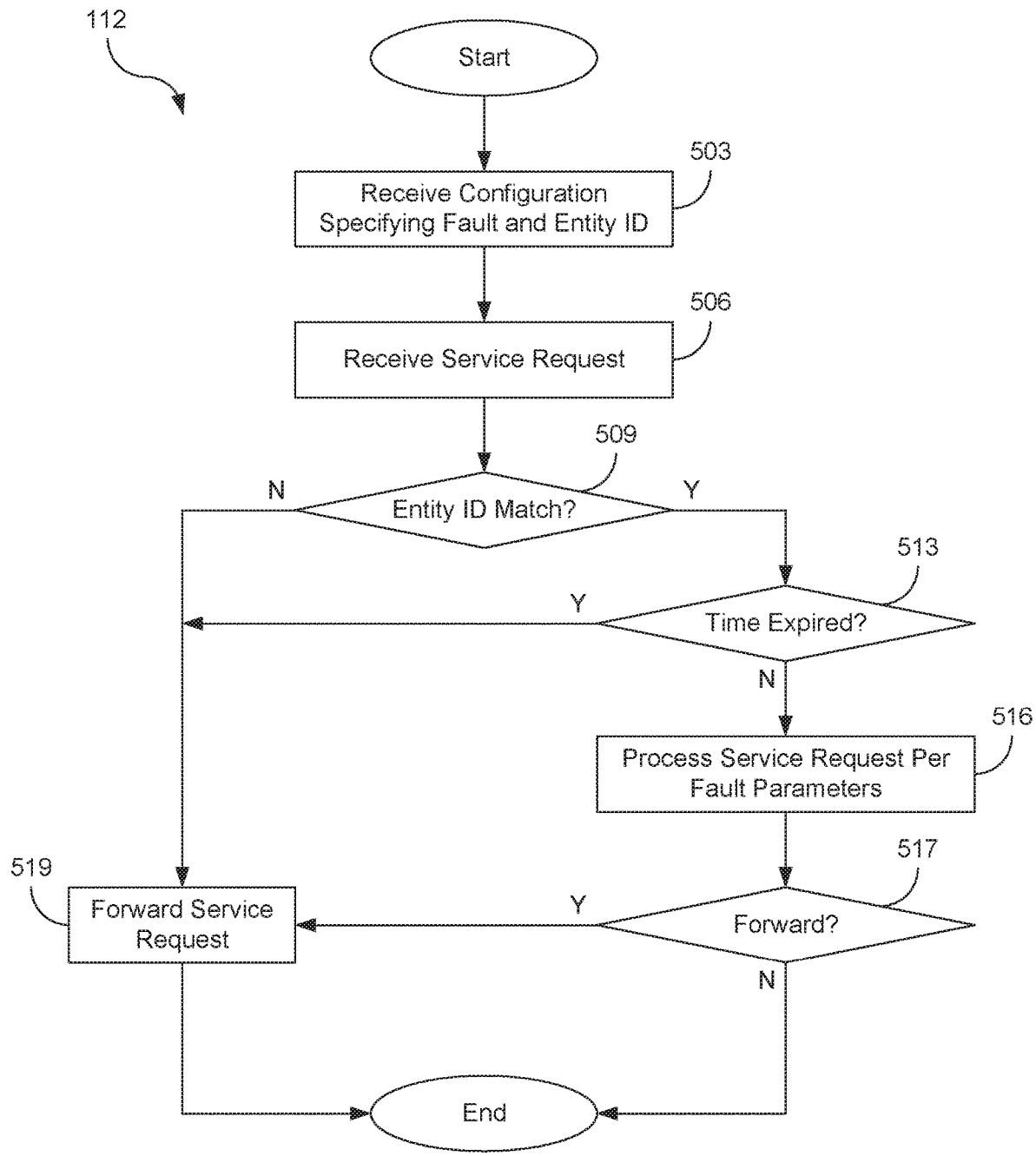
FIG. 5 is a flowchart illustrating one example of functionality implemented as portions of an application executed in the cloud provider network of FIG. 1 according to various embodiments of the present disclosure.

Referring next to FIG. 5, shown is a flowchart that provides one example of the operation of a portion of the service proxy 112. The flowchart of FIG. 5 provides merely an example of the many different types of functional arrangements that can be employed to implement the operation of the depicted portion of the service proxy 112. As an alternative, the flowchart of FIG. 5 can be viewed as depicting an example of elements of a method implemented within the cloud provider network 100.

Beginning at block 503, the service proxy 112 can receive configuration information from the fault injection service 143. For example, the service proxy 112 could receive an invocation of an API function call from the fault injection service 143. The API function call can specify the entity identifier for whom or for which faults should be applied, the fault or type of fault to be applied, how long the fault should be applied to requests from the user, and one or more fault parameters. Fault parameters can specify how the fault should be created or injected. Examples can include how long to delay a response; the type of error message, code, or status to return in a response; a percentage or fraction of service requests to which faults should be applied or injected; or other criteria. Similarly, the service proxy 112 could receive a configuration file from the fault injection service 143, which could the entity identifier for whom or for which faults should be applied, the fault or type of fault to be applied, how long the fault should be applied to requests from the user, and one or more fault parameters. Examples of the types of faults that could be implemented include those previously discussed with respect to FIGS. 1 and 2.

Then, at block 506, the service proxy 112 can receive a service request. For example, the service proxy 112 could receive a service request for the object storage service 141 to access, modify, delete, or store data in an object store managed by the object storage service 141. Similarly, the service proxy 112 could receive a service request for a cloud provider service 142 to perform an action. For example, if the cloud provider service 142 were a managed database service, the service request could be to read, write, modify, or update data stored in the database. As another example, if the cloud provider service 142 were a DNS server, the service request could be to resolve a DNS record to a respective internet protocol address. In another example, if the cloud provider service 142 were a function as a service platform (e.g., AMAZON AWS LAMBDA, GOOGLE CLOUD FUNCTIONS, MICROSOFT AZURE FUNCTIONS, APACHE OPENWHISK, etc.), then the service request could represent a request to execute a function, task, or other set of executable code. Other types of service requests could be received by the service proxy 112 for other types of cloud provider service 142.

The service request can also include an entity identifier, which allows the service proxy 112 to identify the entity (e.g., the user, organization, department, application, etc.) that is making the request. The entity identifier can be used by the service proxy 112 to distinguish requests that should be subject to the fault indicated at block 503 from requests that should be processed normally.

Next at block 509, the service proxy 112 can determine whether the entity identifier included in the service request received at block 506 matches the entity identifier received at block 503. If there is no match, the process can proceed to block 519. However, if the entity identifiers match, then the process proceeds to block 513.

If the process proceeds to block 513, then the service proxy 112 can determine whether the duration for which the fault should be applied to matching service requests, as specified at block 503, has expired. If the duration of time has expired, the process can proceed to block 519. However, if the duration of time specified at block 503 has yet to pass, then the process can proceed to block 516.

Subsequently at block 516, the service proxy 112 can process the service request per the fault parameters specified in the API function call received at block 503. For example, if latency is supposed to be added to service requests, the service proxy 112 could delay forwarding the service requests on to the cloud service provider 142, object storage service 141, etc. As another example, if the fault is supposed to be a response indicating that an error has occurred (e.g., that a requested object or file is unavailable to the object storage service 141; a hypertext transfer protocol (HTTP) error code such as "500—Internal Server Error," "503—Service Unavailable," "504—Gateway Timeout," etc.; that the requested operation did not succeed, etc.), the service proxy 112 could generate the response and return the response to the application or device that made the service request.

However, in some instances the fault parameters could specify that a fault is to be applied to a fraction or percentage of the service requests received by the service proxy 112. In these instances, the service proxy 112 could first determine whether the service request received at block 506 is one of the fraction or percentage of the service requests received. For example, the service proxy 112 could select service requests on a round-robin basis as being subject to the fault. As another example, the service proxy 112 could select service requests at random until a fraction or percentage of an expected number of service requests have been subject to the fault. For instance, if three-hundred (300) service requests were expected in one hour, and one-third of the expected service requests were to be subject to a fault, the service proxy 112 could randomly select service requests to fault until one-hundred (100) service requests had been faulted. Service requests not selected for fault injection could be forwarded by the service proxy 112 on to the network destination specified in the service request without further delay, modification, or alteration.

Because the service proxy 112 is causing or injecting the faults, the cloud service provider 142 or object storage service 141 behind the service proxy 112 is protected from unintended or unanticipated consequences of simulating these faults. For example, the cloud provider service 142 or object storage service 141 may have to keep a connection open for longer than necessary if the cloud provider service 142 or object storage service 141 were waiting to respond to a service request in order to simulate latency. This could impact the ability of the cloud provider service 142 or object storage service 141 to respond to service requests from other clients, users, or applications.

In some instances, the faults injected by the service proxy 112 may involve forwarding a service request on to the destination service (e.g., the cloud service provider 142 or object storage service 141 behind the service proxy 112). For example, faults that involve delaying responses to service requests would involve forwarding the service request onto the destination service. Accordingly, the service proxy 112 can determine, at block 517, whether the service request should be forwarded onto the destination service. If the service request is to be forwarded, then the process proceeds to block 519. Otherwise, the process can end.

However, if the process proceeds to block 519, the service proxy 112 can forward the service request on to its destination, such as the cloud service provider 142, the object storage service 141, etc. The destination service (e.g., the cloud service provider 142 or the object storage service 141), can then process the service request as it normally would.

Figure 6:
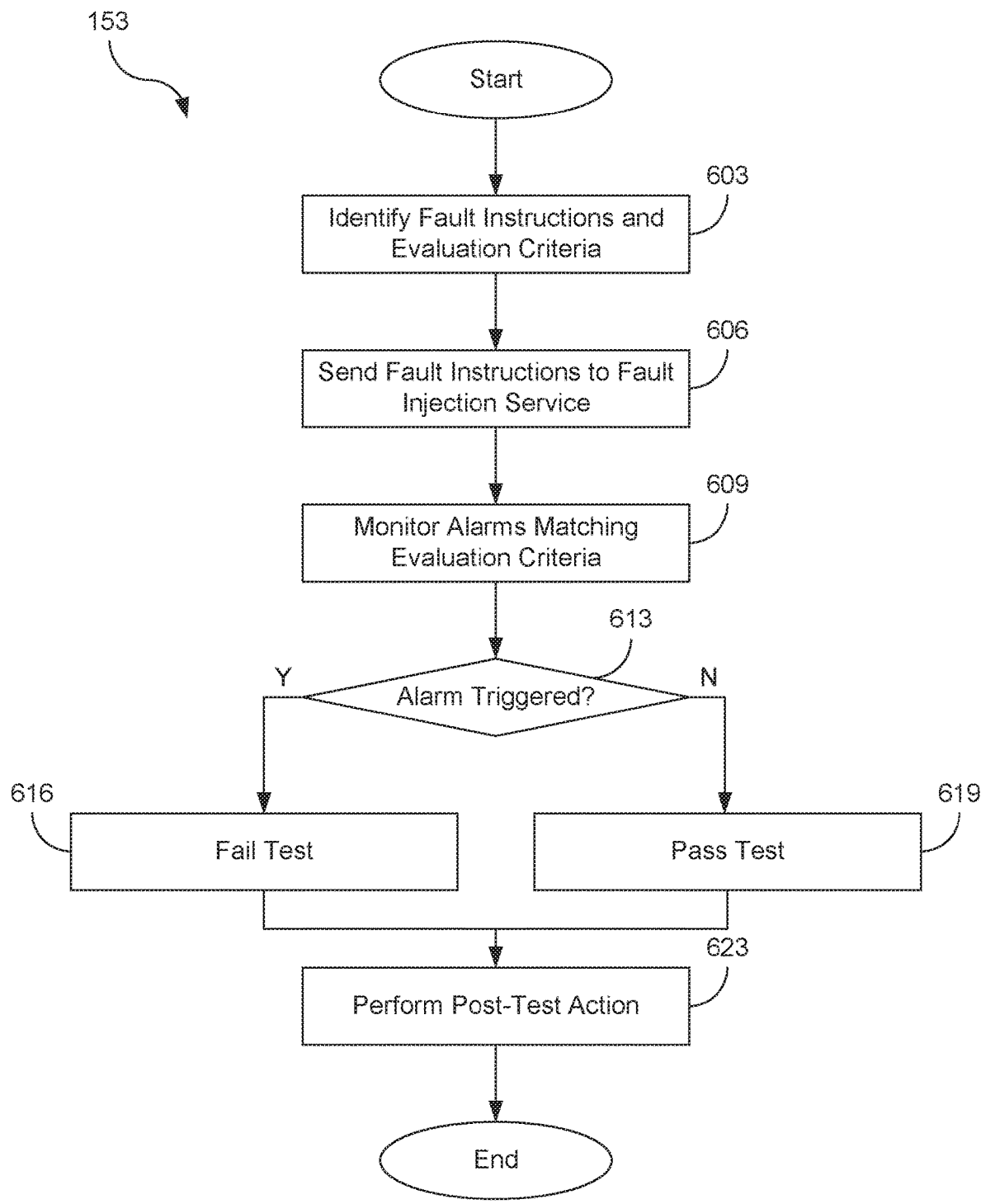
FIG. 6 is a flowchart illustrating one example of functionality implemented as portions of an application executed in the cloud provider network of FIG. 1 according to various embodiments of the present disclosure.

Referring next to FIG. 6, shown is a flowchart that provides one example of the operation of a portion of the test service 153. The flowchart of FIG. 6 provides merely an example of the many different types of functional arrangements that can be employed to implement the operation of the depicted portion of the test service 153. As an alternative, the flowchart of FIG. 6 can be viewed as depicting an example of elements of a method implemented within the cloud provider network 100.

Beginning with block 603, the test service 153 can identify the fault instructions 159 and evaluation criteria 163 associated with a specified test 156. This can be done, for example, in response to a command received to execute the test 156.

Next, at block 606, the test service 153 can send the fault instructions 159 specified in the test 156 to the fault injection service 143. Where a test 156 specifies multiple fault instructions 159, the test service 153 can send multiple fault instructions 159 to the fault injection service 143. Similarly, where a test 156 specifies that the fault instructions 159 be issued in a particular sequence (e.g., to simulate a sequence of faults), then the test service 153 can provide the fault instructions 159 to the fault injection service 143 in the specified sequence.

Then, at block 609, the test service 153 can monitor one or more alarms 149 that match the alarm(s) 149 specified in the evaluation criteria 163. Monitoring could be done using various approaches. For example, the test service 153 could listen for messages from the monitoring service 146 and receive a notification or message from the monitoring service 146 that the specified alarm(s) 149 had been raised.

Moving on to block 613, the test service 153 can determine if an alarm 149 specified as an evaluation criterion 163 was triggered. For example, if the monitoring service 146 sent a message indicating that the alarm 149 had been triggered, the test service 153 could compare the alarm 149 identified by the monitoring service 146 with the alarm(s) specified as evaluation criteria 163 for the test. If an alarm 149 is triggered that was specified as an evaluation criterion 163, then the process proceeds to block 616. If no alarms 149 that were specified as an evaluation criterion were triggered, then the process can proceed instead to block 619.

If the process proceeds to block 616, then the test service 153 can report that the test 156 failed. For example, the test service 153 could send a message or notification to the user, application, service, or device that initiated the test 156. Similarly, the test service 153 could send the message or notification to a predefined recipient specified in the test 156. The message or notification could identify the test 156 and notify them that the test 156 failed and also identify the alarm(s) 149 that were triggered. As another example, the test service 153 could similarly record the failure in a log file or database, which could include the identities of the specific alarm(s) 149 that were triggered.

However, if the process proceeds to block 619, then the test service 153 can report that the test 156 passed. For example, the test service 153 could send a message or notification to the user, application, service or device that initiated the test 156, and the message or notification could identify the test 156 and indicate that it passed. Similarly, the test service 153 could send the message or notification to a predefined recipient specified in the test 156.

From either block 616 or 619, the process could proceed to block 623, where the test service 153 could perform one or more post-test actions, or cause one or more post-test actions to be performed. These post-test actions could be specified by the test 156 being executed. Examples of post-test actions could include executing a program or causing a program to be executed, restoring one or more services or virtual compute instances 116 to a pre-test state, creating additional virtual compute instances 116 in response to a failed test to provide additional capacity, etc.

Figure 7:
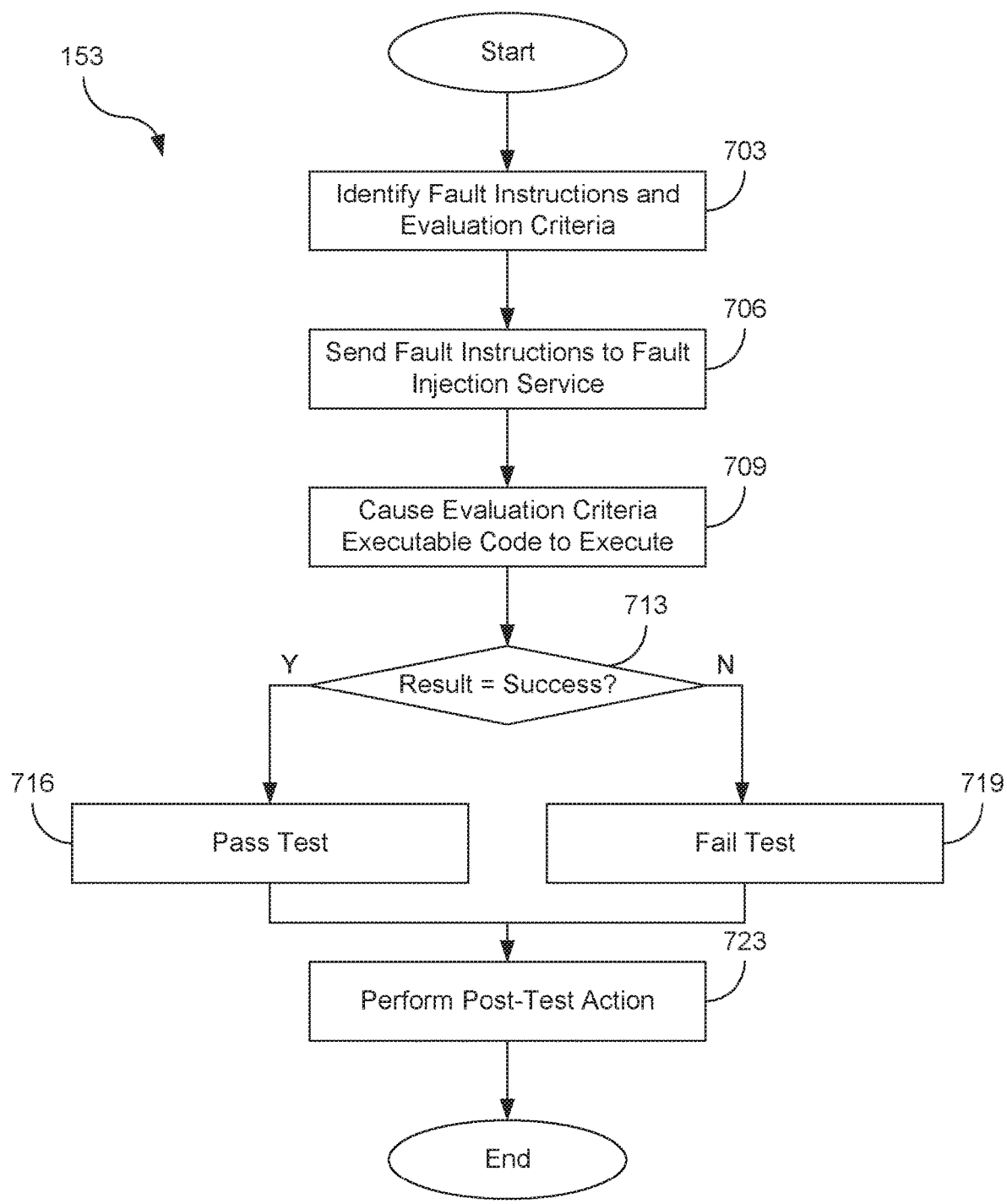
FIG. 7 is a flowchart illustrating one example of functionality implemented as portions of an application executed in the cloud provider network of FIG. 1 according to various embodiments of the present disclosure.

Referring next to FIG. 7, shown is a flowchart that provides another example of the operation of a portion of the test service 153. The flowchart of FIG. 7 provides merely an example of the many different types of functional arrangements that can be employed to implement the operation of the depicted portion of the test service 153. As an alternative, the flowchart of FIG. 7 can be viewed as depicting an example of elements of a method implemented within the cloud provider network 100.

Beginning with block 703, the test service 153 can identify the fault instructions 159 and evaluation criteria 163 associated with a specified test 156. This can be done, for example, in response to a command received to execute the test 156.

Next, at block 706, the test service 153 can send the fault instructions 159 specified in the test 156 to the fault injection service 143. Where a test 156 specifies multiple fault instructions 159, the test service 153 can send multiple fault instructions 159 to the fault injection service 143. Similarly, where a test specifies that the fault instructions 159 be issued in a particular sequence (e.g., to simulate a sequence of faults), then the test service 153 can provide the fault instructions 159 to the fault injection service 143 in the specified sequence.

Then, at block 709, the test service 153 can cause the executable code specified by the evaluation criteria 163 to execute. For example, if the executable code were a container or package registered with an event-driven, serverless compute platform, such as a function as a service platform, then the test service 153 could send a notification to the event-driven, serverless compute platform specified in the evaluation criteria 163 that the test 156 had begun at block 706. As another example, if the executable code were a hosted application accessible via the network 113, then the test service 153 could invoke an API function call provided by the specified hosted application.

The test service 153 can cause the executable code to execute in response to various conditions. For example, the test service 153 could cause the executable code to begin execution in response to the test service 153 sending the fault instructions 159 to the fault injection service 143. In this example, the executable code would be able to evaluate the test 156 as it is performed. In another example, the test service 153 could cause the executable code to begin execution after fault injection service 143 has completed processing of the fault instructions 159 that it received. In these implementations, test service 153 might receive a notification from the fault injection service 143 that it had completed processing of the fault instructions 159.

Moving on to block 713, the test service 153 can receive and evaluate the results of the executable code. In some instances, the executable code could return a result that indicated success or failure. In other instances, the executable code could return results that the test service 153 could compare to results specified by the evaluation criteria 163 as indicating success or failure. In either approach, if the test service 153 determines that the results returned from the executable code indicate success, then the process proceeds to block 716. However, if test service 153 determines that the results returned from the executable code indicate failure, then the process proceeds to block 719.

If the process proceeds to block 716, then the test service 153 can report that the test 156 passed. For example, the test service 153 could send a message or notification to the user, application, service or device that initiated the test 156, and the message or notification could identify the test 156 and indicate that it passed. Similarly, the test service 153 could send the message or notification to a predefined recipient specified in the test 156.

However, if the process proceeds to block 719, the test service 143 could report the test 156 as having failed. For example, the test service 153 could send a message or notification to the user, application, service, or device that initiated the test 156. Similarly, the test service 153 could send the message or notification to a predefined recipient specified in the test 156. The message or notification could identify the test 156 and notify them that the test 156 failed. The message or notification could also include the results returned by the executable code that indicated failure. As another example, the test service 153 could similarly record the failure in a log file or database, which could include the results of the executable code that indicated failure.

From either block 616 or 619, the process could proceed to block 623, where the test service 153 could perform one or more post-test actions, or cause one or more post-test actions to be performed. These post-test actions could be specified by the test 156 being executed. Examples of post-test actions could include executing a program or causing a program to be executed, restoring one or more services or virtual compute instances 116 to a pre-test state, creating additional virtual compute instances 116 in response to a failed test to provide additional capacity, etc.

Figure 8:
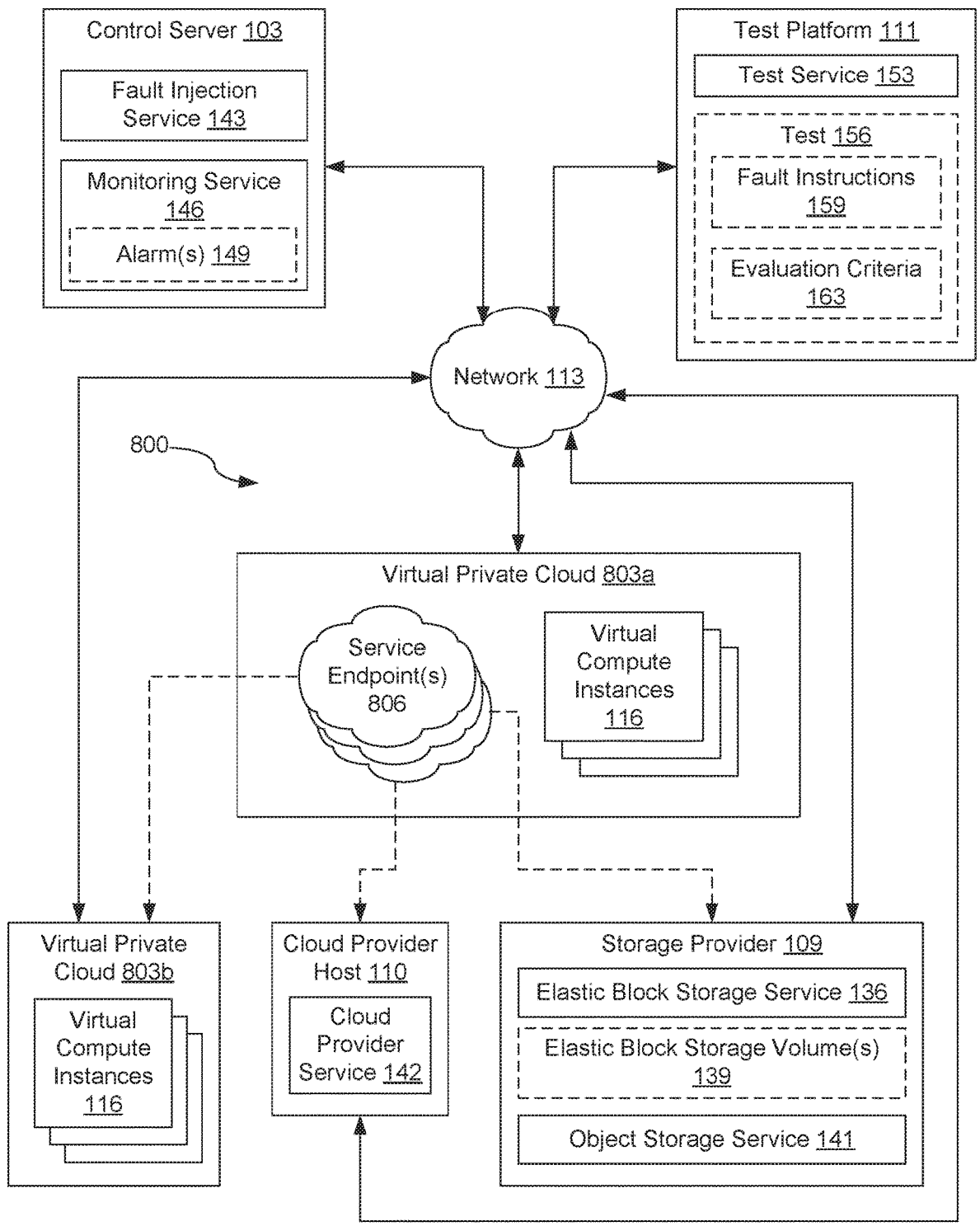
FIG. 8 is a drawing of a network environment according to various embodiments of the present disclosure.

FIG. 8 depicts a second example of a cloud provider network, denoted here as the cloud provider network 800. Like the cloud provider network 100 depicted in FIG. 1, the cloud provider network 800 has a control server 103, a storage provider 109, a cloud provider host 110, and a test platform 111. The control server 103, storage provider 109, cloud provider host 110, and the test platform 111 operate in the same or similar manner as described in FIG. 1. Moreover, the cloud provider network 800 can include one or more virtual private clouds 803, such as virtual private cloud 803*a* and virtual private cloud 803*b* (collectively referred to as "virtual private clouds 803").

A virtual private cloud 803 can represent a configurable pool of virtual compute instances 116 allocated within the cloud provider network 800. However, the virtual compute instances 116 assigned to a virtual private cloud 803 can be isolated or segregated from other users of the cloud provider network 800. For example, the virtual compute instances 116 maybe hosted on separate host machines 126, assigned network addresses allocated from a private internet protocol (IP) address subnet or virtual local area network (VLAN), etc. Access to the virtual compute instances 116 within the virtual private cloud 803 may be secured through the use of virtual private network (VP N) tunnels that connect the virtual private cloud 803 to the user's own network.

A virtual private cloud 803 can also contain one or more service endpoints 806, which act as a secure tunnel that allows virtual compute instances 116 within the virtual private cloud 803 to access services, applications, or computing devices outside of the virtual private cloud. For example, the virtual private cloud 803a has multiple service endpoints 806 that allow direct communication between virtual compute instances 116 within the virtual private cloud 803a and the storage provider 109, cloud provider host 110 or virtual private cloud 803b.

A service endpoint 806 can represent a private network interface located within a virtual private cloud 803 (e.g., virtual private cloud 803a), which provides a connection to a service or application located outside of the virtual private cloud 803. In some implementations, the service endpoint 806 can be connected to a network load balancer placed in front of the destination of the service endpoint 806. A service endpoint 806 can have a network address assigned to it from the network address range available to virtual compute instances 116 within the virtual private cloud 803a. An example of a service endpoint 806 is AMAZON AWS PRIVATELINK.

For example, a service endpoint 806 within the virtual private cloud 803 could act as a link to the object storage service 141. When a request is made by a virtual compute instance 116 to access the object storage service 141, it could use the private address of the service endpoint 806 for the object storage service 141 to send the request to the service endpoint 806. Once the service endpoint 806 receives the request, it could forward it on to the object storage service 141 and return the response from the object storage service 141. Accordingly, the owner or user of the virtual private cloud 803a can access the object storage service 141 without having to make any modifications to the firewall rules that control access to the virtual private cloud 803a from the network 113.

Service endpoints 806 can also be configured to inject or cause faults as specified by the fault instructions 159 of a test 156. For example, a service endpoint could be configured or reconfigured to act in a manner similar to a service proxy 112, as previously discussed. As one example, the service endpoint 806 could add delays to requests sent to or responses received from the destination of the service endpoints 806. As another example, the service endpoint 806 could drop requests or responses from the destination of the service endpoint 806. As a third example, the service endpoint 806 could generate errors on behalf of the destination of the service endpoint 806 (e.g., object or data unavailable, responses with HTTP error codes, etc.).

As described in further detail, a test service 153 could execute a test 156. The fault instructions 159 could specify the target of test as being the object storage service 141 and the entity identifier as the user or owner of the virtual private cloud 803a. The fault instructions 159 could also specify one or more faults to be injected into traffic between the virtual compute instances 116 of the virtual private cloud 803a and the object storage service 141. The test service 153 could provide these fault instructions 159 to the fault injection service 143.

The fault injection service 143 could then create a service endpoint 806 between the virtual private cloud 803a and the object storage service 141 to be used for the test 156. As part of the creation process, the fault injection service 143 could configure the service endpoint 806 to inject the faults specified in the fault instructions 159. Once created, the fault injection service 143 could modify the routing of traffic from the virtual compute instances 116 of the virtual private cloud 803a to the object storage service 141, so that the traffic uses the newly created service endpoint 806. This could be done using any one of several approaches. For example, the fault injection service 143 could cause the network address assigned to the preexisting service endpoint 806 to be reassigned to the newly created service endpoint 806. As another example, the fault injection service 143 could modify routing table entries or DNS records within the virtual private cloud 803a to cause the virtual compute instances 116 of the virtual private cloud 803a to use the newly created service endpoint 806 in order to access the object storage service 141.

The newly created service endpoint 806 could then inject faults as specified for a duration of time specified by the fault injection service 143. Once the test 156 is completed, the fault injection service 143 could reverse the changes made to the virtual private cloud 803a. For example, the fault injection service 143 could reassign the private network address back to the original service endpoint 806 or revert the changes made to the routing tables or DNS records of the virtual private cloud 803a.

Figure 9:
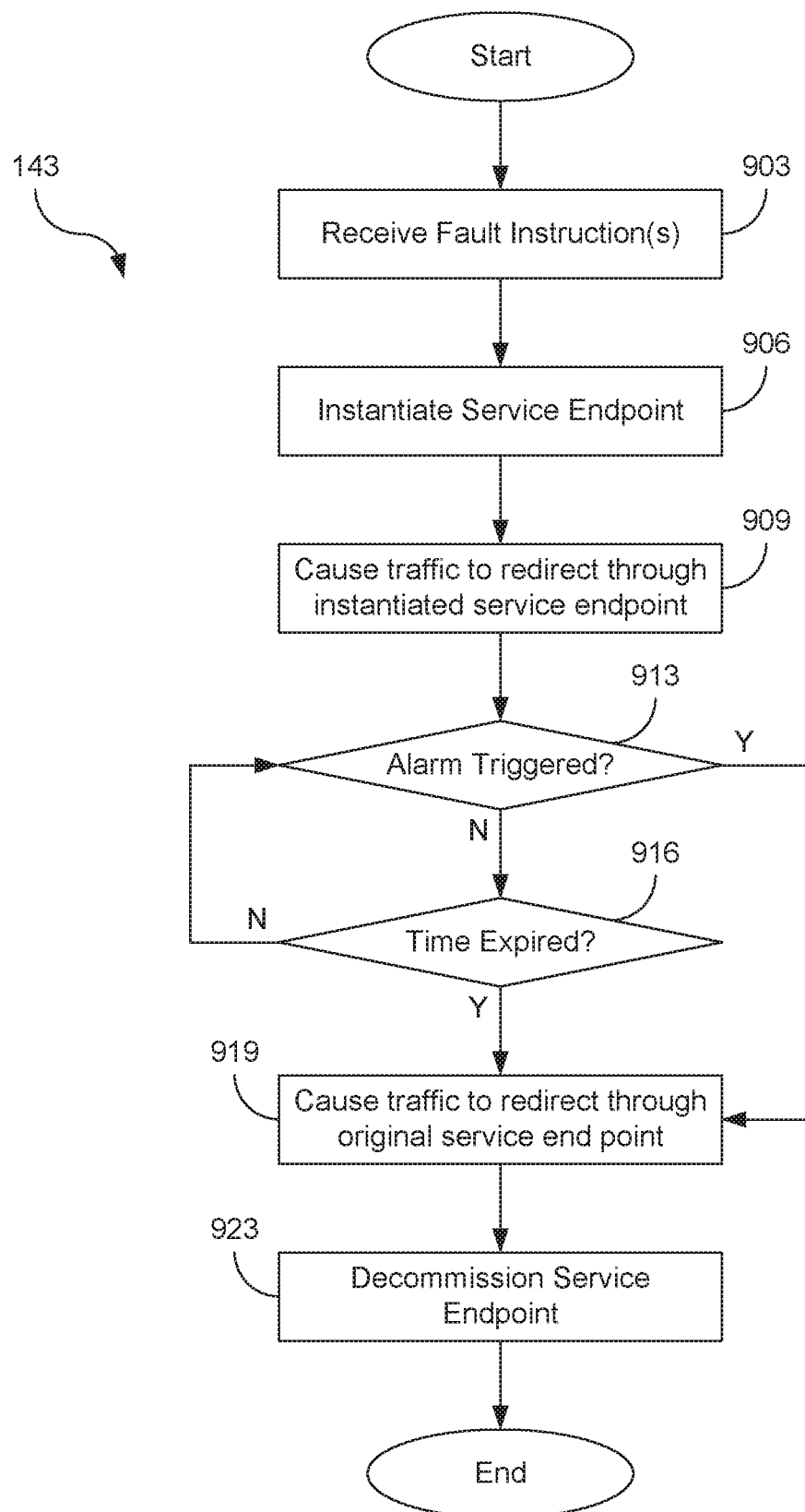
FIG. 9 is a flowchart illustrating one example of functionality implemented as portions of an application executed in the cloud provider network of FIG. 8 according to various embodiments of the present disclosure.

Referring next to FIG. 9, shown is a flowchart that provides one example of the operation of a portion of the fault injection service 143. The flowchart of FIG. 9 provides merely an example of the many different types of functional arrangements that can be employed to implement the operation of the depicted portion of the fault injection service 143. As an alternative, the flowchart of FIG. 9 can be viewed as depicting an example of elements of a method implemented within the cloud provider network 800.

Beginning with block 903, the fault injection service 143 can receive one or more fault instructions 159. These fault instructions 159 could, for example, be received from a test service 153 that is performing a test 156 of the cloud provider network 800. As another example, the fault injection service 143 could receive a message from a client device using a management or administrative console, wherein the message contains one or more fault instructions 159. This could occur, for instance, when a user is manually testing the performance of applications hosted by the virtual compute instances 116 within the virtual private cloud 803a.

Next at block 906, the fault injection service 143 can instantiate a service endpoint 806. For example, the fault injection service 143 could create a service endpoint 806 within the virtual private cloud 803a that provides a connection to the cloud provider service 142, object storage service 141, or virtual private cloud 803b specified as the target by the test 156 or fault instructions 159. The fault injection service 143 could also configure the newly created service endpoint 806 to inject, create, or cause the faults specified by the fault instructions 159 received. Examples of the types of faults that could be specified by fault instructions 159 have been previously discussed. As part of the instantiation process, the fault injection service 143 could also invoke an application programming interface (API) function provided by the service endpoint 806 to pass the fault instructions 159 received at block 903 to the service endpoint 806. Similarly, the fault injection service 143 could provide a configuration file to the instantiated service endpoint 806, which the service endpoint 806 could read in order to configure itself.

Then at block 909, the fault injection service 143 can cause the traffic within the virtual private cloud 803a destined for the cloud provider service 142, object storage service 141, or virtual private cloud 803b specified as the target to use the service endpoint 806 instantiated or created at block 906. For example, if there were a preexisting service endpoint 806 configured for the cloud provider service 142, object storage service 141, or virtual private cloud 803b specified as the target, then the fault injection service 143 could cause a private network address assigned to a preexisting service endpoint 806 to be reassigned to the newly created service endpoint 806. As another example, the fault injection service 143 could modify routing table entries or DNS records within the virtual private cloud 803a to cause the virtual compute instances 116 of the virtual private cloud 803a to use the newly created service endpoint 806 in order to access the cloud provider service 142, object storage service 141, or virtual private cloud 803b specified as the target.

Moving on to block 913, the fault injection service 143 can the fault injection service 143 can determine whether an alarm 149 was triggered in response to a fault caused by the service endpoint 806 instantiated at block 906. This could be done using several approaches. For example, the fault injection service 143 could receive a notification or message from the monitoring service 146 indicating that the alarm 149 had been triggered. However, in other instances, the fault injection service 143 itself could evaluate various performance metrics of the targeted virtual compute instances 116 of the virtual private cloud 803a, or applications hosted thereon, to determine whether there had been a sufficient performance degradation to trigger an alarm 149. If the alarm 149 is triggered, then the process proceeds to block 919. However, if no alarm 149 is triggered or raised, then the process can proceed to block 916.

Next at block 916, the fault injection service 143 can determine whether the duration for introducing faults, as specified in the fault instructions, has passed. For example, the fault injection service 143 could evaluate whether a timer or counter has exceeded a duration of time specified in the fault instruction 159. If the timer or counter has yet to meet or exceed the duration of time specified in the fault instruction 159, the process could return to block 913. However, if the specified duration of time has expired, then the process can proceed to block 919.

Proceeding to block 919, the fault injection service 143 can cause traffic passing across the service endpoint 806 instantiated at block 906 to begin traversing the original service endpoint 806. For example, the fault injection service 143 could cause the private network address of the original service endpoint 806 that had been reassigned at block 909 to the service endpoint 806 instantiated at block 906 to be reassigned back to the original service endpoint 806. As another example, the fault injection service 143 could revert the changes made to the routing tables or DNS records of the virtual private cloud 803a that were made at block 909.

Then at block 923, the fault injection service 143 can then destroy, delete, or otherwise decommission the service endpoint 806 that was instantiated at block 906. This can be done, for example, to conserve the computing resources available to the virtual private cloud 806a (e.g., in instances where there is a limit on the number of service endpoints 806 that can be simultaneously used by or assigned to a virtual private cloud 806).

Figure 10:
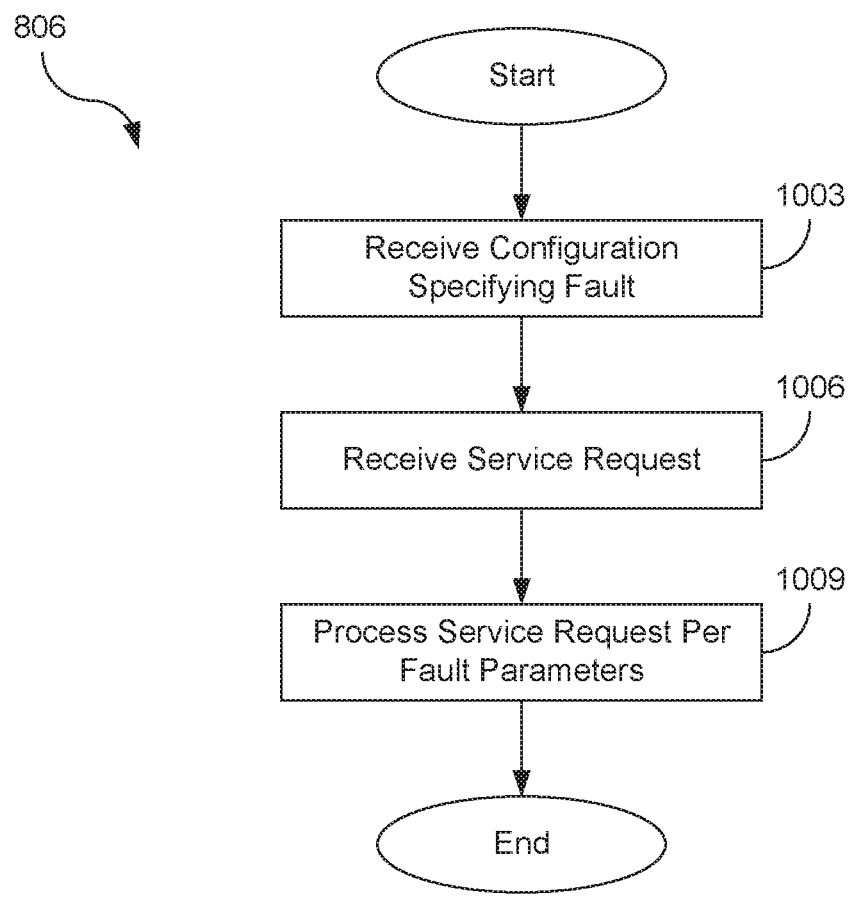
FIG. 10 is a flowchart illustrating one example of functionality implemented as portions of an application executed in the cloud provider network of FIG. 8 according to various embodiments of the present disclosure.

Referring next to FIG. 10, shown is a flowchart that provides one example of the operation of a portion of the service endpoint 806. The flowchart of FIG. 10 provides merely an example of the many different types of functional arrangements that can be employed to implement the operation of the depicted portion of the service endpoint 806. As an alternative, the flowchart of FIG. 10 can be viewed as depicting an example of elements of a method implemented within the cloud provider network 800.

Beginning with block 1003, the service endpoint 806 can receive configuration information from the fault injection service 143. For example, the service endpoint 806 could receive an invocation of an API function call from the fault injection service 143. The API function call can specify the entity identifier for whom or for which faults should be applied, the fault or type of fault to be applied, how long the fault should be applied to requests from the user, and one or more fault parameters. Fault parameters can specify how the fault should be created or injected. Examples can include how long to delay a response; the type of error message, code, or status to return in a response; a percentage or fraction of service requests to which faults should be applied or injected; or other criteria. Similarly, the service endpoint 806 could receive a configuration file from the fault injection service 143, which could the entity identifier for whom or for which faults should be applied, the fault or type of fault to be applied, how long the fault should be applied to requests from the user, and one or more fault parameters. In some implementations, the fault injection service 143 could also provide the service endpoint 806 with fault parameters specifying virtual compute instance 116 identifiers, thereby allowing faults to be applied based on the source of the service request. Other examples of the types of faults that could be implemented include those previously discussed with respect to FIGS. 1 and 2.

Moving on to block 1006, the service endpoint 806 can receive a service request. For example, the service endpoint 806 could receive a service request for the object storage service 141 to access, modify, delete, or store data in an object store managed by the object storage service 141. Similarly, the service proxy 112 could receive a service request for a cloud provider service 142 to perform an action. For example, if the cloud provider service 142 were a managed database service, the service request could be to read, write, modify, or update data stored in the database. As another example, if the cloud provider service 142 were a DNS server, the service request could be to resolve a DNS record to a respective internet protocol address. In another example, if the cloud provider service 142 were a function as a service platform (e.g., AMAZON AWS LAMBDA, GOOGLE CLOUD FUNCTIONS, MICROSOFT AZURE FUNCTIONS, APACHE OPENWHISK, etc.), then the service request could represent a request to execute a function, task, or other set of executable code. Other types of service requests could be received by the service proxy 112 for other types of cloud provider service 142. In some instances, the service request could even be for a service hosted by another virtual private cloud 806b.

Then, at block 1009, the service endpoint 806 can process the service request per the fault parameters specified in the API function call or configuration file received at block 1003. Many examples of the types of faults that could be implemented have been previously described. For example, as previously discussed, the service endpoint 806 could fail to respond to the service request (or a specified fraction of matching service requests). The service endpoint 806 could also generate and return error messages as specified by the fault parameters. As another example, the service endpoint 806 could add a delay to the response to the service request (or add a delay to a specified fraction of matching service requests), in order to simulate latency in responding to service requests. Similarly, the service endpoint 806 could alter the amount of network bandwidth by an amount specified at block 1003.

However, in some instances the fault parameters could specify that a fault is to be applied to a fraction or percentage of the service requests received by the service endpoint 806. In these instances, the service endpoint 806 could first determine whether the service request received at block 1006 is one of the fraction or percentage of the service requests received. For example, the service endpoint 806 could select service requests on a round-robin basis as being subject to the fault. As another example, the service endpoint 806 could select service requests at random until a fraction or percentage of an expected number of service requests have been subject to the fault. For instance, if three-hundred (300) service requests were expected in one hour, and one-third of the expected service requests were to be subject to a fault, the service endpoint 806 could randomly select service requests to fault until one-hundred (100) service requests had been faulted. Service requests not selected for fault injection could be forwarded by the service endpoint 806 on to the network destination connected to the service endpoint 806 without further delay, modification, or alteration.

Moreover, the service endpoint 806 could also inject faults based on the source virtual compute instance 116 of the service request, as specified at block 1003 by the fault injection service 143. As the virtual private cloud 803 may have virtual compute instances 116 spread across multiple host machines 106, data centers, or geographic regions, the service endpoint 806 could determine whether to inject a fault based on the identifier of the virtual compute instance 116 making the service request. This could be done to simulate faults in the network connections of or between different datacenters that host the virtual compute instances 116 that form the virtual private cloud 803.

Because the service endpoint 806 is causing the faults, the services behind the service endpoint 806 are protected from unintended or unanticipated consequences of simulating these faults. For example, the services behind the service endpoint 806 may have to keep a connection open for longer than necessary if the service were waiting to respond to a service request in order to simulate latency. This could impact the ability of the service to respond to service requests from other clients, users, or applications.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g, storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same cloud provider network 100 or cloud provider network 800.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
    a computing device comprising a processor and a memory;
    machine-readable instructions stored in the memory that, when executed by the processor, cause the computing device to at least:
        receive a command to execute a test, the test comprising at least one fault instruction and an alarm, the alarm being specified as an evaluation criterion for the test;
        send the fault instruction to a fault injection service, the fault injection service being hosted on a control server that is a component of a logical control plane of a cloud provider network and configured to introduce faults directly in a host machine for a virtual machine or a network connected to the host machine;
        receive a message from a monitoring service, the message indicating that the alarm has been triggered subsequent to sending the fault instruction to the fault injection service;
        determine that the test has failed based at least in part on the alarm being triggered; and
        send a failure notification to a predefined recipient in response to detecting that the alarm has been triggered.

2. The system of claim 1, wherein the test measures an impact of a fault specified in the fault instruction on a virtual compute instance.

3. The system of claim 1, wherein the test measures an impact of a fault specified in the fault instruction on an application or computing device utilizing a service specified in the fault instruction.

4. The system of claim 1, wherein the machine-readable instructions further cause the computing device to save a record that the test has failed to a log in response to the alarm being triggered.

5. A method, comprising:
    identifying a fault instruction and an alarm associated with a test, the alarm being specified as an evaluation criterion for the test;
    sending the fault instruction to a fault injection service, the fault injection service being hosted on a control server that is a component of a logical control plane of a cloud provider network and configured to introduce faults directly in a host machine for a virtual machine or a network connected to the host machine;
    detecting that the alarm has been triggered; and
    determining that the test has failed based at least in part on detecting that the alarm has been triggered.

6. The method of claim 5, wherein detecting that the alarm has been triggered further comprises listening for a message from a monitoring service indicating that the alarm has been triggered.

7. The method of claim 5, further comprising receiving a command to execute the test, wherein identifying the fault instruction and the alarm associated with test is performed in response to receiving the command.

8. The method of claim 5, further comprising presenting a failure notification to a predefined recipient in response to detecting that the alarm has been triggered.

9. The method of claim 5, further comprising saving record that the test has failed to a log in response to detecting that the alarm has been triggered.

10. The method of claim 5, wherein the fault instruction is one of many fault instructions with a specified order, and sending the fault instruction to the fault injection service further comprises sending the fault instruction in the specified order.

11. The method of claim 5, wherein the test measures an impact of a fault specified in the fault instruction on a virtual compute instance.

12. The method of claim 5, wherein the test measures an impact of a fault specified in the fault instruction on an application or computing device utilizing a service specified in the fault instruction.

13. A system, comprising:
   a computing device comprising a processor and a memory; and
   machine-readable instructions stored in the memory that, when executed by the processor, cause the computing device to at least:
      identify a fault instruction and an evaluation criterion specified by a test, the evaluation criterion comprising executable code that can generate a test result;
      send the fault instruction to a fault injection service, the fault injection service being hosted on a control server that is a component of a logical control plane of a cloud provider network and configured to introduce faults directly in a host machine for a virtual machine or a network connected to the host machine;
      cause the executable code to execute;
      receive the test result generated by the executable code in response to execution of the executable code; and
      determine that the test has passed or failed based at least in part on the test result.

14. The system of claim 13, wherein the machine-readable instructions cause the executable code to execute in response to the fault instruction being sent to the fault injection service.

15. The system of claim 13, wherein:
   the machine-readable instructions further cause the computing device to receive a notification from the fault injection service that the fault injection service has completed processing of the fault instruction; and
   the machine-readable instructions cause the executable code to execute in response to receipt of the notification from the fault injection service.

16. The system of claim 13, wherein the executable code comprises a container registered with an event-driven, serverless compute platform and the machine-readable instructions that cause the executable code to execute further cause the computing device to send a notification to the event-driven, serverless compute platform to initiate execution of the container.

17. The system of claim 13, wherein the executable code comprises a hosted application accessible via a network, and the machine-readable instructions that cause the executable code to execute further cause the computing device to invoke an application programming interface (API) function provided by the hosted application.

18. The system of claim 13, wherein the fault instruction is one of many fault instructions with a specified order, and the machine-readable instructions cause the computing device to send the fault instruction to the fault injection service in the specified order.

19. The system of claim 13, wherein the machine-readable instructions further cause the computing device to receive a command to execute the test.

20. The system of claim 13, wherein the machine-readable instructions further cause the computing device to send a failure notification to a predefined recipient in response to detecting that the alarm has been triggered.

* * * * *